United States Patent [19]

Becker

[11] 3,947,614

[45] Mar. 30, 1976

[54] PROTECTION FROM CORROSION OF RESISTANCE-WELDED SHEET METAL COVERED WITH NON-METALLIC LAYERS

[76] Inventor: Otto Alfred Becker, 59 Robert-Koch-Strasse, 66 Saarbrucken 6, Germany

[22] Filed: Nov. 20, 1972

[21] Appl. No.: 307,836

Related U.S. Application Data

[63] Continuation of Ser. No. 56,197, July 13, 1970, abandoned, which is a continuation of Ser. No. 681,694, Nov. 9, 1967, abandoned.

[30] Foreign Application Priority Data

| Nov. 11, 1966 | Germany | 89773 |
| Feb. 6, 1967 | Germany | 91065 |
| Feb. 11, 1967 | Germany | 91162 |
| July 29, 1967 | Germany | 93710 |
| Sept. 2, 1967 | Germany | 94270 |

[52] U.S. Cl. ............... 427/284; 156/202; 427/287; 427/428; 427/429; 428/140; 428/194; 428/209

[51] Int. Cl.² .......................................... C23F 11/00

[58] Field of Search ...... 117/2 R, 43, 122 P, 111 R, 117/111 C, 111 D, 111 H; 118/256, 264; 156/202, 230, 234, 272, 293; 161/99, 115, 109, 147; 427/142, 256, 284, 287, 428, 429; 428/138, 194, 209, 137, 140

[56] References Cited
UNITED STATES PATENTS

| 1,779,588 | 10/1930 | Doty et al. | 117/43 |
| 2,239,536 | 8/1941 | Muros | 117/43 |
| 2,566,151 | 8/1951 | Wright | 117/43 |
| 2,616,638 | 11/1952 | George | 117/43 |
| 2,622,053 | 12/1952 | Clowe et al. | 161/115 |
| 2,676,704 | 4/1954 | Marks | 161/115 |
| 2,687,111 | 8/1954 | Deniston | 118/256 |
| 3,051,600 | 8/1962 | Markus et al. | 161/115 |
| 3,189,480 | 6/1965 | Franzen et al. | 117/76 A |
| 3,190,785 | 6/1965 | Comet | 156/230 |
| 3,218,187 | 11/1965 | Wade | 117/43 |
| 3,306,971 | 2/1967 | Olson et al. | 174/119 |
| 3,455,716 | 7/1969 | Loring et al. | 106/268 |
| 3,625,732 | 12/1971 | Nelson | 117/43 |
| 3,655,479 | 4/1972 | Helmes et al. | 156/212 |
| 3,723,212 | 3/1973 | Casper | 156/69 |
| 3,729,362 | 4/1973 | French et al. | 156/542 |
| 3,738,888 | 6/1973 | Williams | 156/238 |

*Primary Examiner*—Thomas J. Herbert, Jr.
*Assistant Examiner*—Bruce H. Hess
*Attorney, Agent, or Firm*—Erich M. H. Radde

[57] ABSTRACT

A method for the protection of blanc areas of sheet metal otherwise coated with layers of synthetic materials, lacquers, foils or the like, wherein the said blanc areas are covered by applying a liquid, viscous or solid rust-protective agent by frictional contact, spraying, welding or cementing and a machine for carrying out the above method, comprising means for applying a liquid or pasty rust-protective agent and/or tape or cord on said areas by temporarily moving the means for applying these agents and/or tapes or cords towards, along and away from the sheet metal and, if desired, pressing the same on and/or drying the same on the sheet metal.

9 Claims, 51 Drawing Figures

Fig. 6

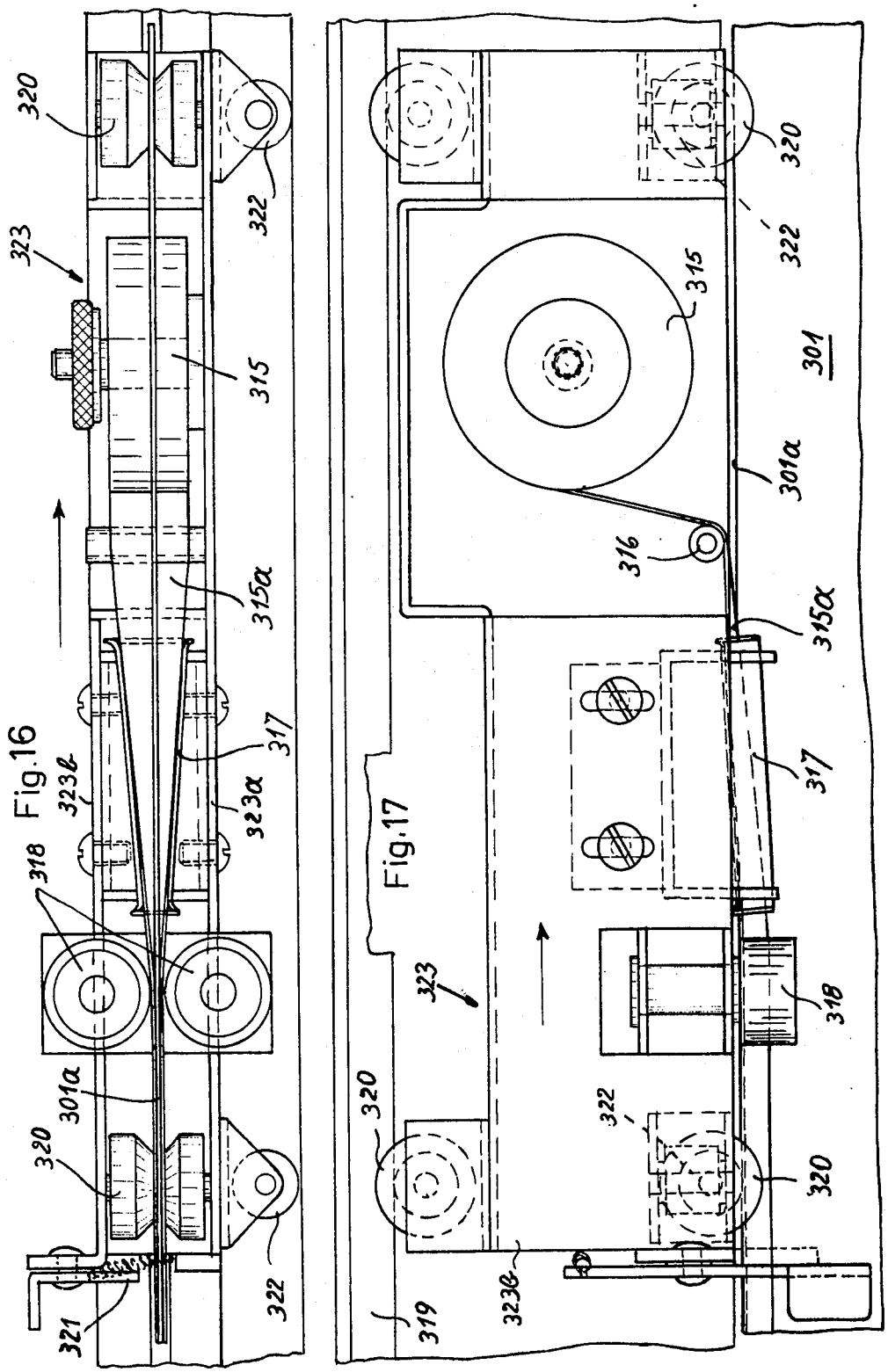

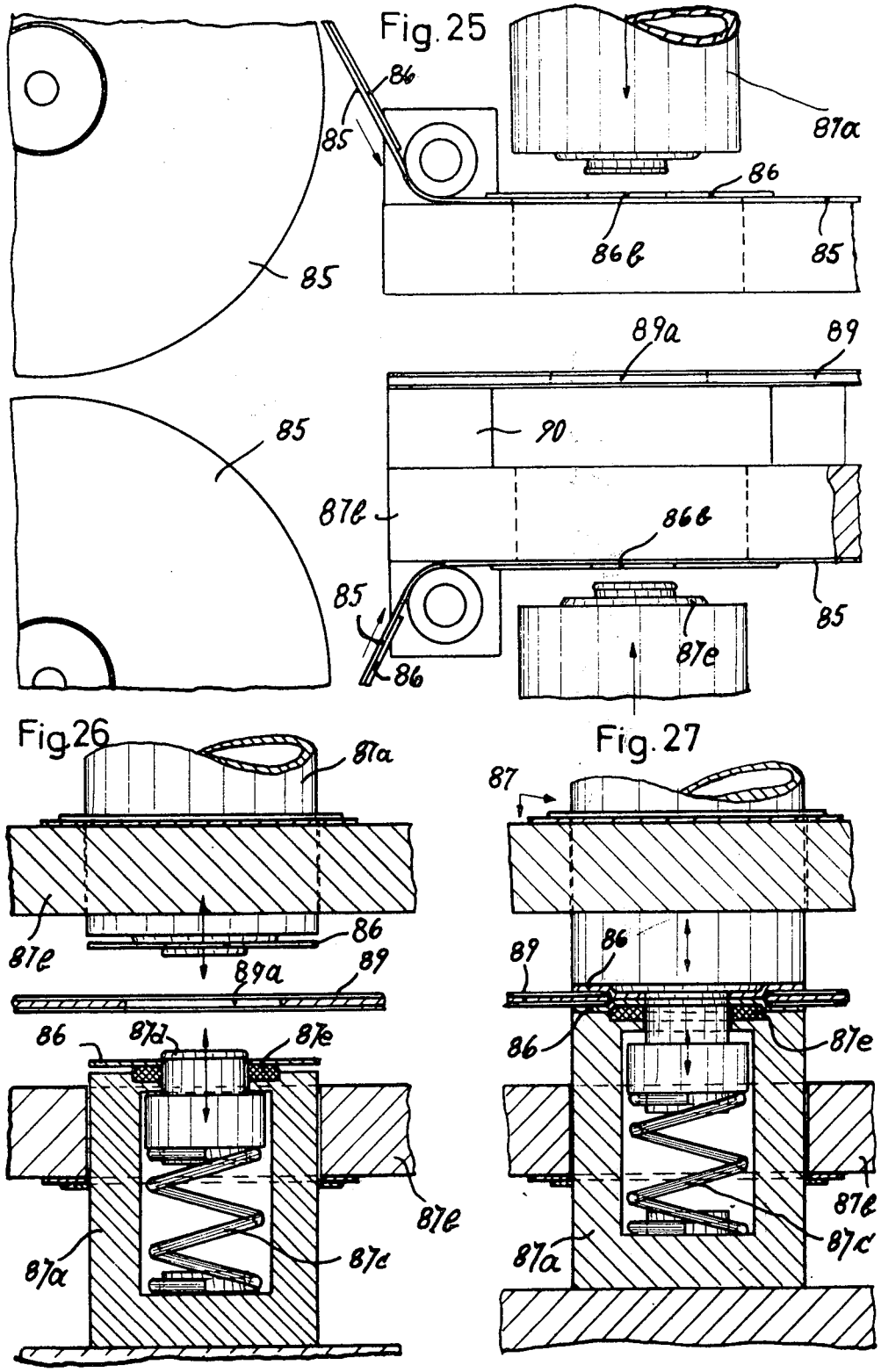

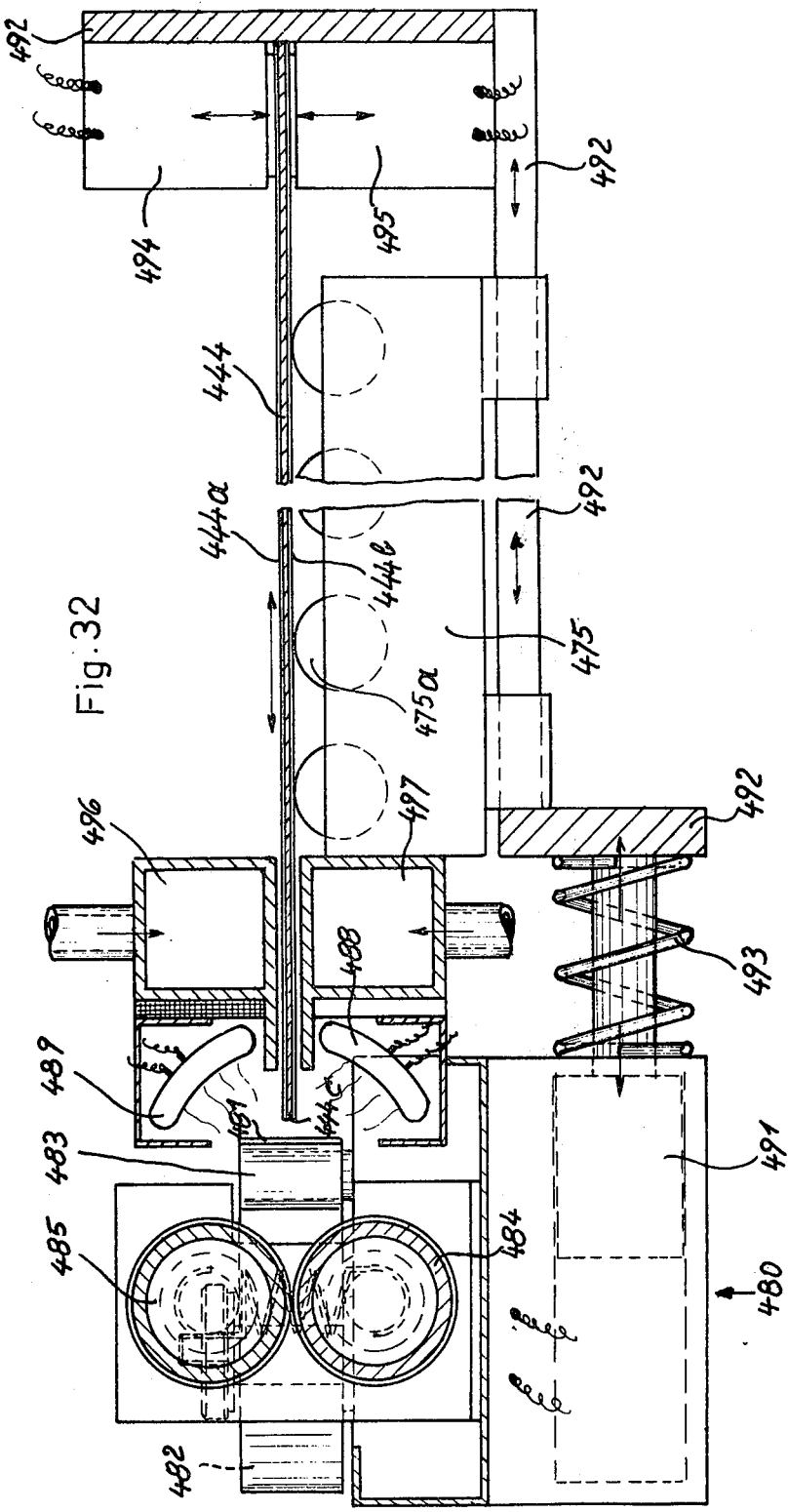

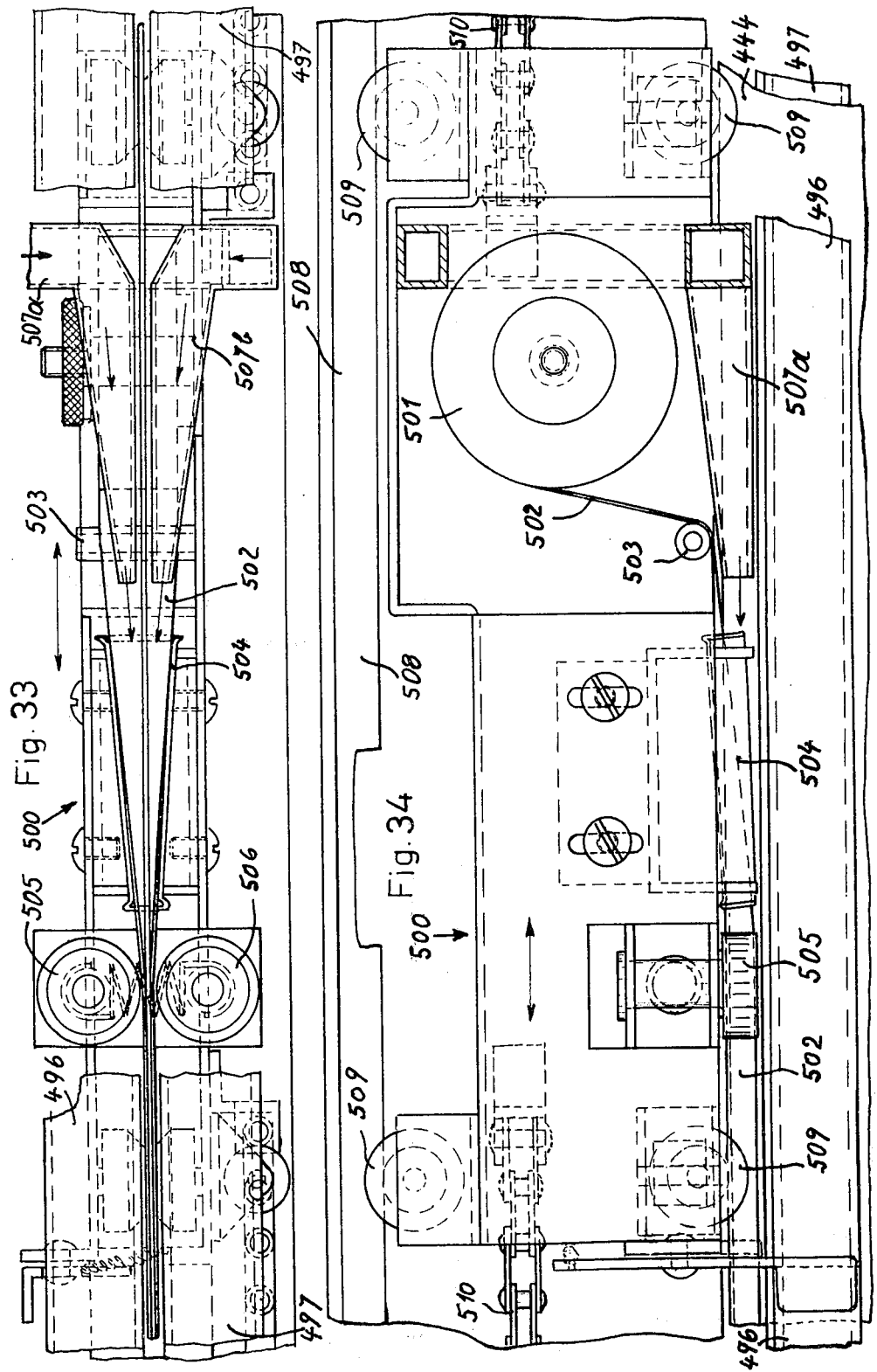

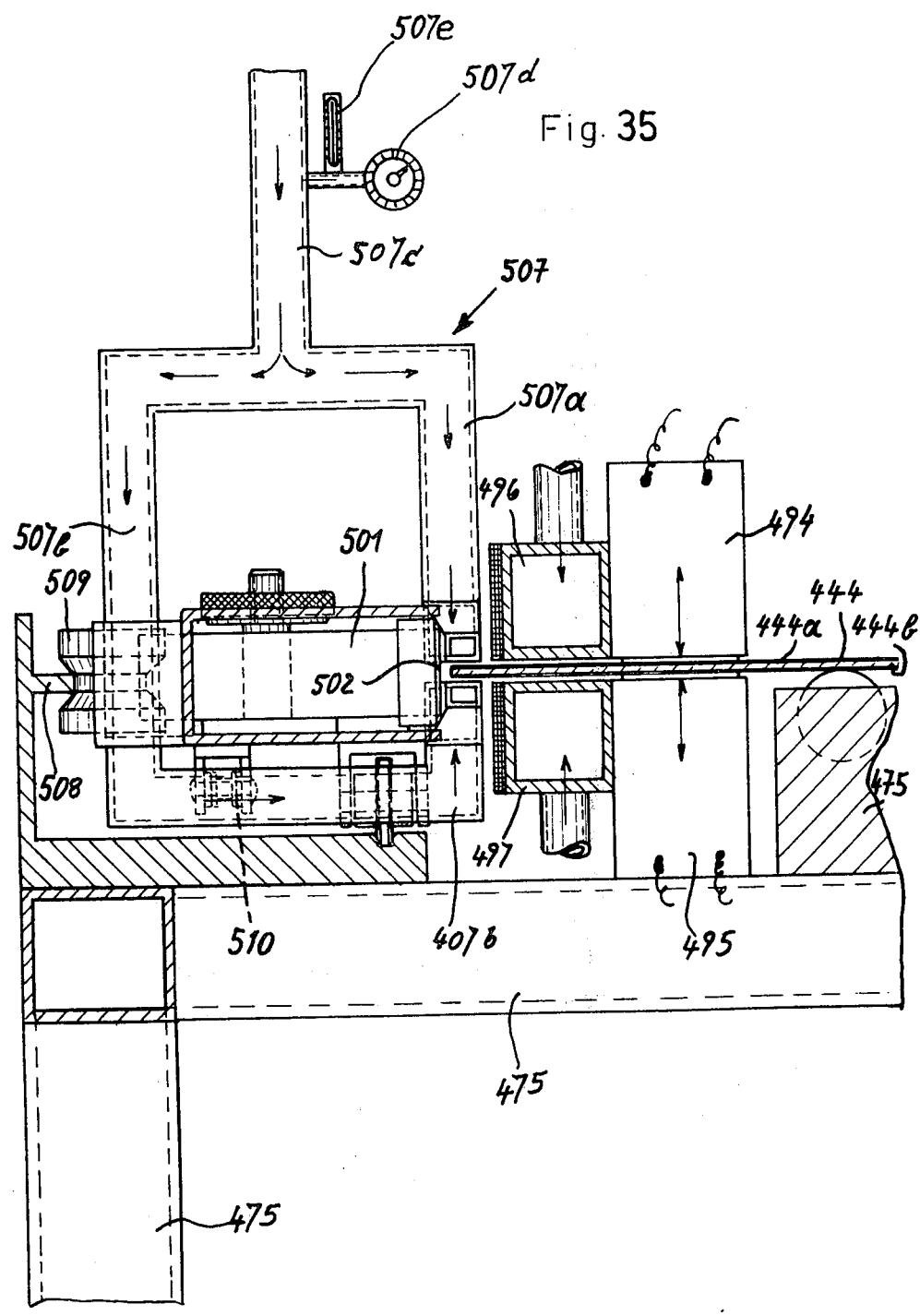

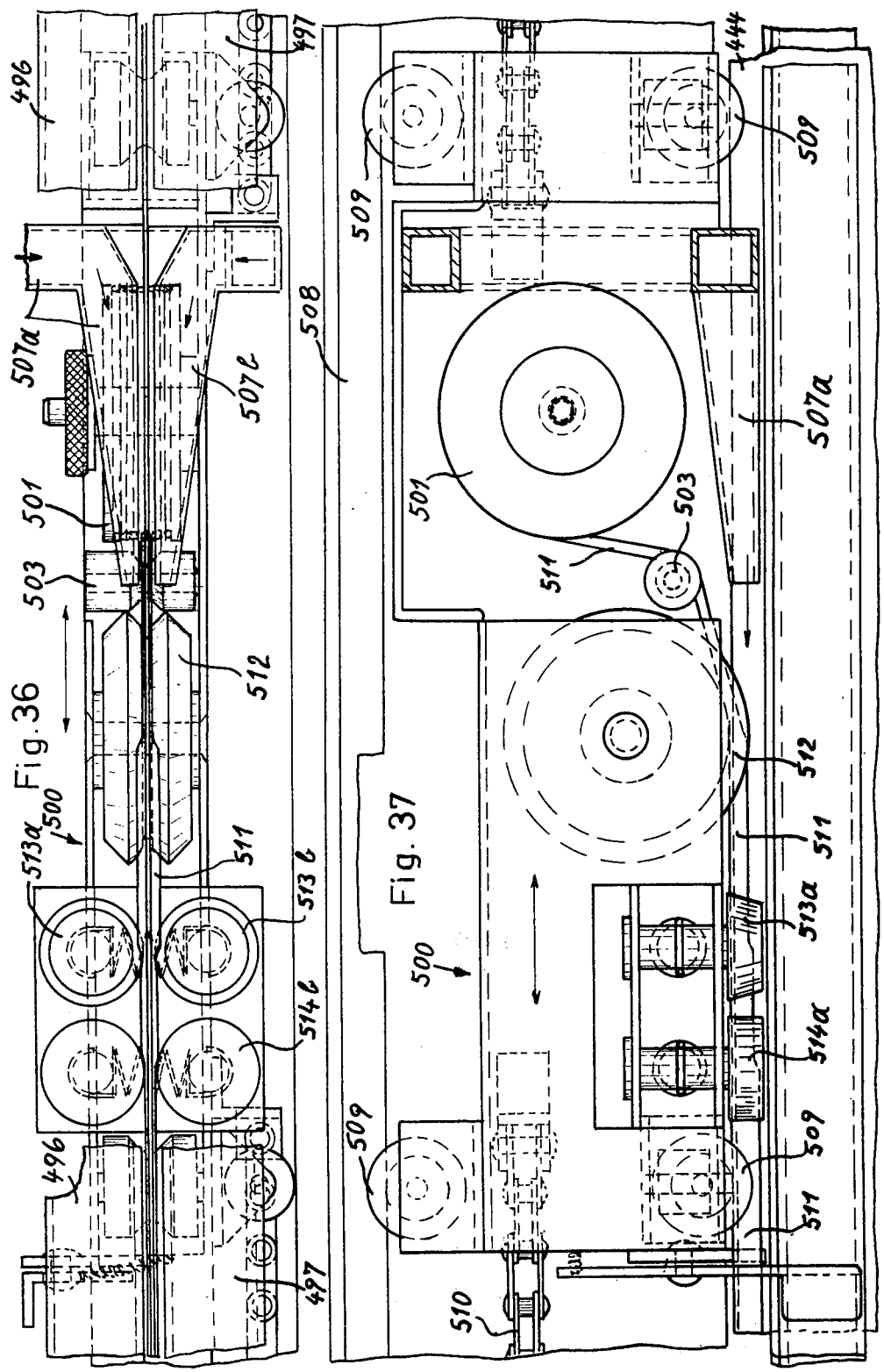

PROTECTION FROM CORROSION OF RESISTANCE-WELDED SHEET METAL COVERED WITH NON-METALLIC LAYERS

This is a continuation of application Ser. No. 56,197, now abandoned, which is a continuation of application Ser. No. 681,694, which is now abandoned.

Sheet metal is usually protected from corrosion by being covered with lacquer. However, on the one hand it is difficult, to produce a faultless lacquer surface, and on the other hand the coating of lacquer is little resistant to scratching and impacts and is soon destroyed at weak spots by rust creeping under it. A much more durable protection is constituted by foils of synthetic material, which are cemented hot on the sheet metal, or layers of synthetic material, which are rolled as a pasty mass on the sheet metal. Such layers are resistant to impact, and can be produced in many different colours. They may, moreover, be made with patterns, texture and grains. Their use involves many advantages, but their economic treatment constitutes difficulties. They can be welded only, when the layer is removed from the areas to be welded. In order to restore a closed surface layer these areas have to be closed again. For this purpose no economically bearable methods have been available yet, so that coated sheet metal is used but little, in spite of its advantages. Since only the surfaces of the sheet metal are coated with layers, their edges remain uncoated, and so are likewise the cut edges formed when cutting the sheet metal to shape. In order to attain a perfect and durable protection from rusting, the edges of sheet metal have also to be covered.

Accordingly there exists the problem of protecting sheet metal, covered in various ways, on the blank or stripped areas thereof from corrosion, and to re-coat the same there, so that the work piece has on all sides a perfect rust-protecting layer. Moreover, machines and devices are to be developed which allow a quick and economic applying of the rust-protection, and which in particular can be fitted into a production line for mass production.

According to a first method, an absorbent material, e.g. a sponge, soaked with a liquid rust-protective agent, is conducted along the blank zones of the sheet metal — by moving either the sheet metal or the sponge. Thereby the blank zones are coated. The sponge is attached in a simple way to a closure wall of a storage container for the liquid agent, and is pressed by a spring on the edge to be coated. For arcuate edges or edges positioned transversely of the direction of transport of the sheet metal the coating device is placed on a carriage and is guided along the edge of the sheet metal by the aid of rails. For the introduction of the sheet metal an orifice formed by resilient slot ledges is provided.

When the edges of the sheet metal have projecting or receding edge portions, e.g. triangular punched-out zones, the orifice and the sponge are adapted to these edge portions. By pressing these edge portions on the sponge for a short time, the same are coated with lacquer.

For coating the edges of holes within the area of the sheet metal the absorbent material is mounted on a cone, whose cross section is adapted to that of the hole. The cone forms at the same time a storage container for the lacquer. When pressing-in the cone of the sponge, the cut edge of the hole is coated. For intense coating, the cone of the sponge may be mounted on a shaft, and turned by a motor. The driven cone with the sponge is then mounted on the container by the aid of a seal.

For coating at a higher rate, rollers covered with absorbent material are provided, whose axes are positioned transversely of the plane of the sheet metal. When being pushed along the edge of the sheet metal, the roller rotates. The roller is supplied uniformly with a rust-protective agent by contacting a transfer roller mounted side-by-side with it, which transfer roller in turn receives further supply from a drip tube of the container.

Rust-protective agents of higher viscosity are applied by means of spray nozzles, whereby the blank areas of adjacent layers are to be covered. For this purpose resilient slot ledges of the spray device casing are constructed as cover ledges. In a modification the cover is formed by adhesive tape, the protruding portion of which forms a protective hood for the spray nozzle. Moreover, strippers covered with felt may be mounted on the device.

A comparatively thick protective layer results from the use of pasty rust-protective agents. Moreover, strips stripped of their layer on the surface of a sheet metal panel may be filled with pasty synthetic material, and thus a uniform layer may be produced. For applying the paste, rotatable rollers or circulating belts are used, which are pressed against or moved along the blank areas, past which the blank areas are pushed. According to a first embodiment, the roller dipping into a trough for the rust-protective agent extends along an edge or a strip; according to a second embodiment the axis of the applying roller is perpendicular to the edge; according to a third embodiment a pair of rollers extends along the margin, stripped of its layers on both sides, of a sheet metal panel; and according to a fourth embodiment, roller portions for the coating of strips are mounted on the shafts of the rollers. The supply rollers driven by a motor and the troughs for the rust-protective agent can be readily dismantled and easily cleaned, so as to be capable of working with two-components media such as putty, adhesive cement etc., which are stable in the mixed condition for a short time only. Finally the pasty substance may be applied firstly to a belt, and then be pressed, together with the belt, on the sheet metal, and thus be cemented to it. Thus strip-shaped recesses in comparatively thick layers of synthetic material or foils may be filled in and closed.

According to a third method, a coating resistant to scratching and impacts is applied by the cementing-on of tapes preferably consisting of the same foils as those which serve for coating the sheet metal. Advantageously the tape has been previously provided with adhesive, i.e. a self-adhesive tape is used, which is only to be applied and to be pressed on. In a first device, a reel of adhesive tape is mounted on a carriage, which is guided by rollers between the edge to be covered of the sheet metal and a rail lying parallel thereto. The adhesive tape drawn from the reel is folded about the edge of the sheet metal by a prefolding funnel, and is pressed by two presser-rollers onto the upper- and under-side of the stripped area of the sheet metal panel, and is cut off at the end of the sheet metal edge. In a second device, for edges positioned transversely of the direction of transport of the sheet metal panel, the carriage is pulled by means of a chain by a motor. In a third embodiment, the adhesive tape is stretched out by two rollers lying one above the other; the edge of the sheet metal panel is pushed towards the middle of the tape and is then pushed together with the tape folding itself between the rollers, whereby the tape is pressed on. For projecting or receding portions of the edge, e.g. a triangular cut-out in the edge, an orifice of corresponding shape with clamping jaws is provided, in front of which the adhesive tape is stretched out. When pressing on the tape, blades make incisions in the tape in such a manner that the tape can be folded about the edges. Holes in the surface of the sheet metal have likewise bare edges. For the purpose of covering the holes, an adhesive disc from below, and an adhesive disc from above, are cemented on the edges of the hole, and within the hole the two adhesive discs are cemented on one another. For treatment on a machine, the adhesive discs are firstly cemented on a tension belt, one such belt being stretched out above and one below the holes in the sheet metal; the adhesive discs are punched out, and are pressed against the sheet metal and against each other. The tension belt can be pulled along stepwise by a winding-on reel. In a modification, an expandable adhesive ring is pressed with its outer edge against the edge of the hole; then it is bent with its inner portion through the hole; and finally pressed on the opposite edge of the hole. For this purpose a compressed air cylinder is provided with an elastically inflatable upper portion, and is compressible between a holder ledge and an opposite ledge.

According to a fourth method, tapes or cords of synthetic material are heated, together with the adjacent layers, to their welding temperature, and are then interwelded by pressing. The heating may be effected by infra-red radiation. In a machine with a stretched-out weldable tape and with the edge of the sheet metal standing in front of the same, the infra-red radiators are formed arcuate, and are arranged in front of the tape and above as well as below the sheet metal edge. When the welding temperature of the tape is reached, the sheet metal is automatically pushed against the tape and between presser rollers, and the tape is thus interwelded with it. The heating may alternatively be effected by a hot air blower. On a carriage guided along the sheet metal edge and carrying a tape reel, pre-folding funnel and presser rollers, a hot air blower is mounted, whose upper and lower outlet nozzles extend along the sheet metal edge and blow the hot air into the pre-folding funnel. Instead of a weldable tape, a weldable cord could be used. The heated cord is firstly pressed against the edge by a presser roller, and is then welded to the sheet metal edges by means of a pair of form rollers as well as by a pair of presser rollers. Finally the welding temperature may be established by electrically heated elements. For the coating of a gap in the corner between two mutually abutting angular turn-ups, a piece of weldable cord and an electrically heated form member filling that corner are inserted. The gap in the corner can be covered from outside with a piece of weldable cord by the aid of a pivotable form member. The form members are guided or pivoted on a support platform for the work piece, and can be pressed on by means of levers. The layers adjacent to the welded zones are protected from overheating by cooling plates or by water-cooled tubes.

For sheet metal panels, which run along a production line, the rust-protective devices are moved for short periods into contact with the sheet metal panels. For this purpose the individual devices are provided each with an advance device, and the advance as well as the retraction thereof is controlled automatically. The advance device comprises a casing with the advance means, and a slider advanced by them carrying the treatment device. By lowering the advance device, a switch initiates the advance and the treatment, and by the advancing treatment device abutting a second switch, the treatment is terminated and the return movement is made possible. In a first advance device a compressed air cylinder with piston is provided as the advance means, which pushes an applying means with sponge against the sheet metal edge. Instead of the applying means, a hot air drier for the coated edge may be mounted. In a second embodiment an inflatable hose serves as the advance means.

The treatment device consists in a covering means, by which the adhesive tape is pressed-on by the aid of inflated hoses. In a third advance device an electromagnet is provided as the advance means. The treatment device comprises an endless supply belt running over rollers, which is covered with absorbent material.

Protection from corrosion can be attained also on formed sheet metal panels interwelded into finished products e.g. the doors of a motor car body. The uncoated edges could be coated with lacquer in one operation by means of an applying device. For this purpose the applying device extends all round along the edges, forming a frame. This frame is hollow and forms at the same time a storage reservoir. It tapers downwardly forming an orifice filled with absorbent material and having a convergent slot for receiving the edges. When for welding purposes also the adjacent margins have been stripped, the sponge has a slot, which embraces the margins. The edges could alternatively be covered by an adhesive tape. For arcuate edges, the adhesive tape is pressed on from outside by means of a carriage guided on rails, and is folded over the edges by a roller. With straight edges, the adhesive tape is stretched out in a simple way over the edges by the aid of a tension belt and of a winding-up reel. The applied and stretched-out adhesive tapes are folded over the edges and pressed on by means of clamping jaws. These clamping jaws are mounted on a frame, which can be raised or lowered, and which may carry also the storage reels and the motor-driven winding-on reels. Inflatable hoses may serve as the presser means.

In the accompanying drawings the various methods are illustrated and the devices and machines are shown, which are required for carrying out the methods.

Figure 10:
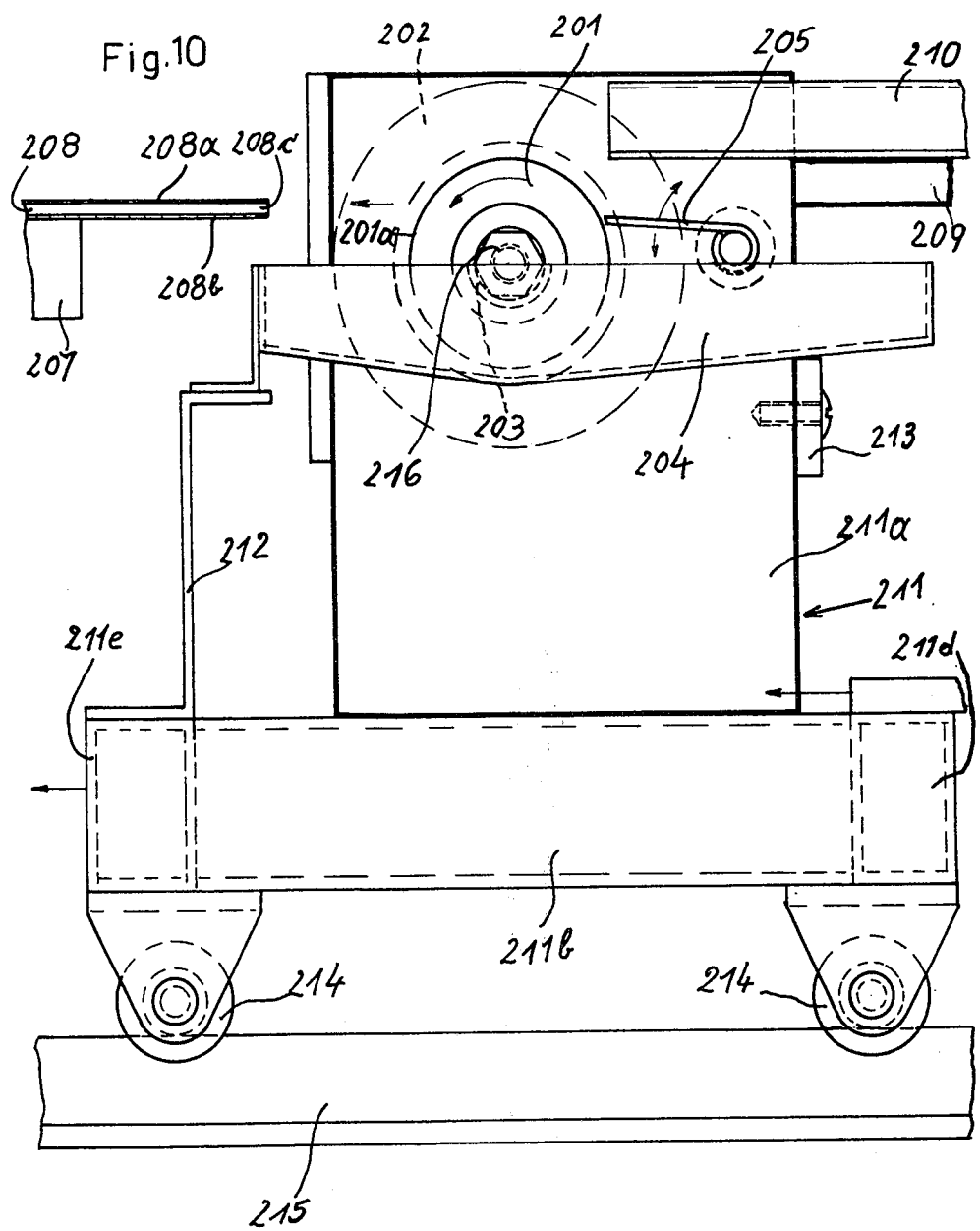
Figure 11:
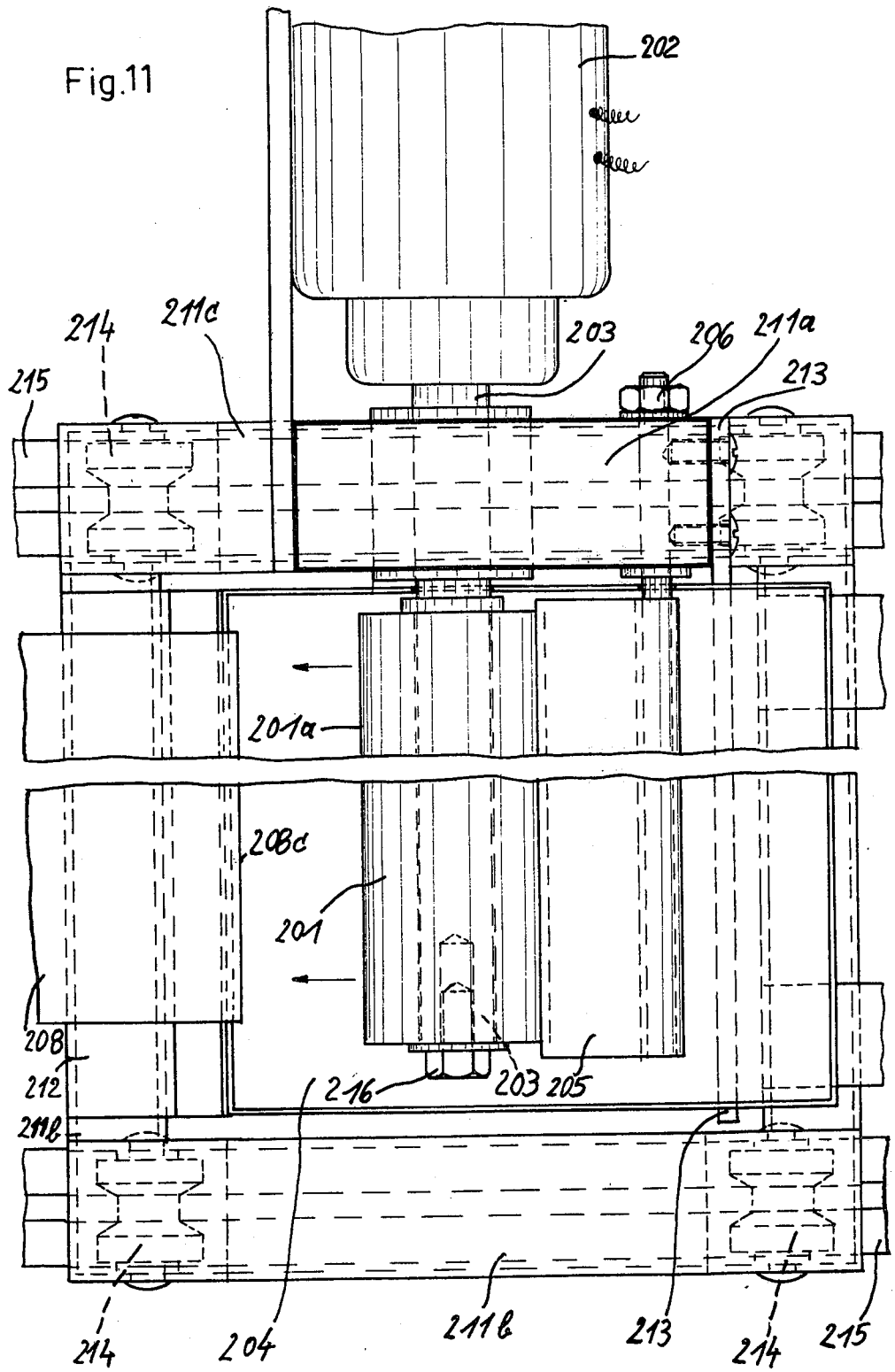
Figure 12:
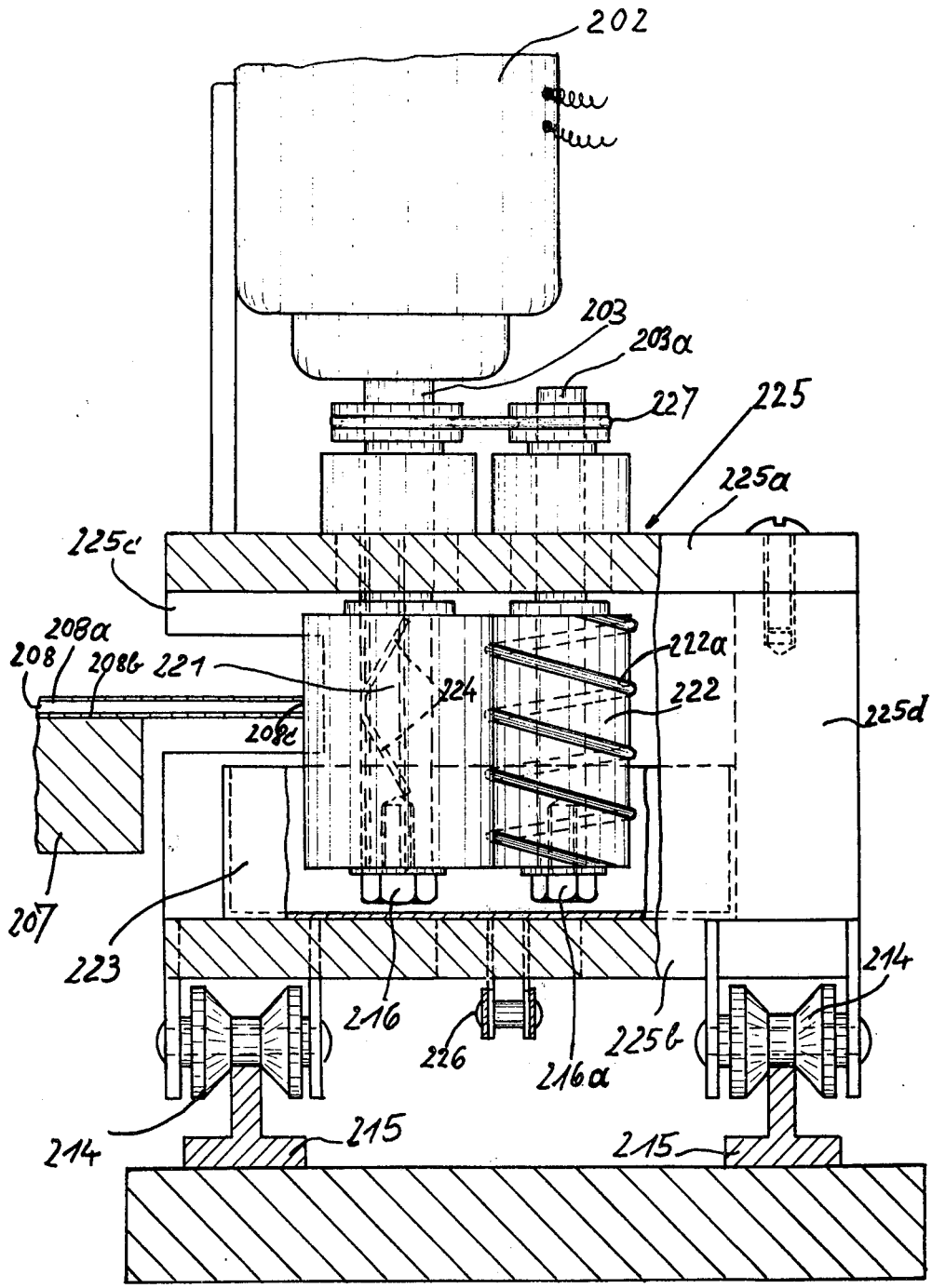
Figure 13:
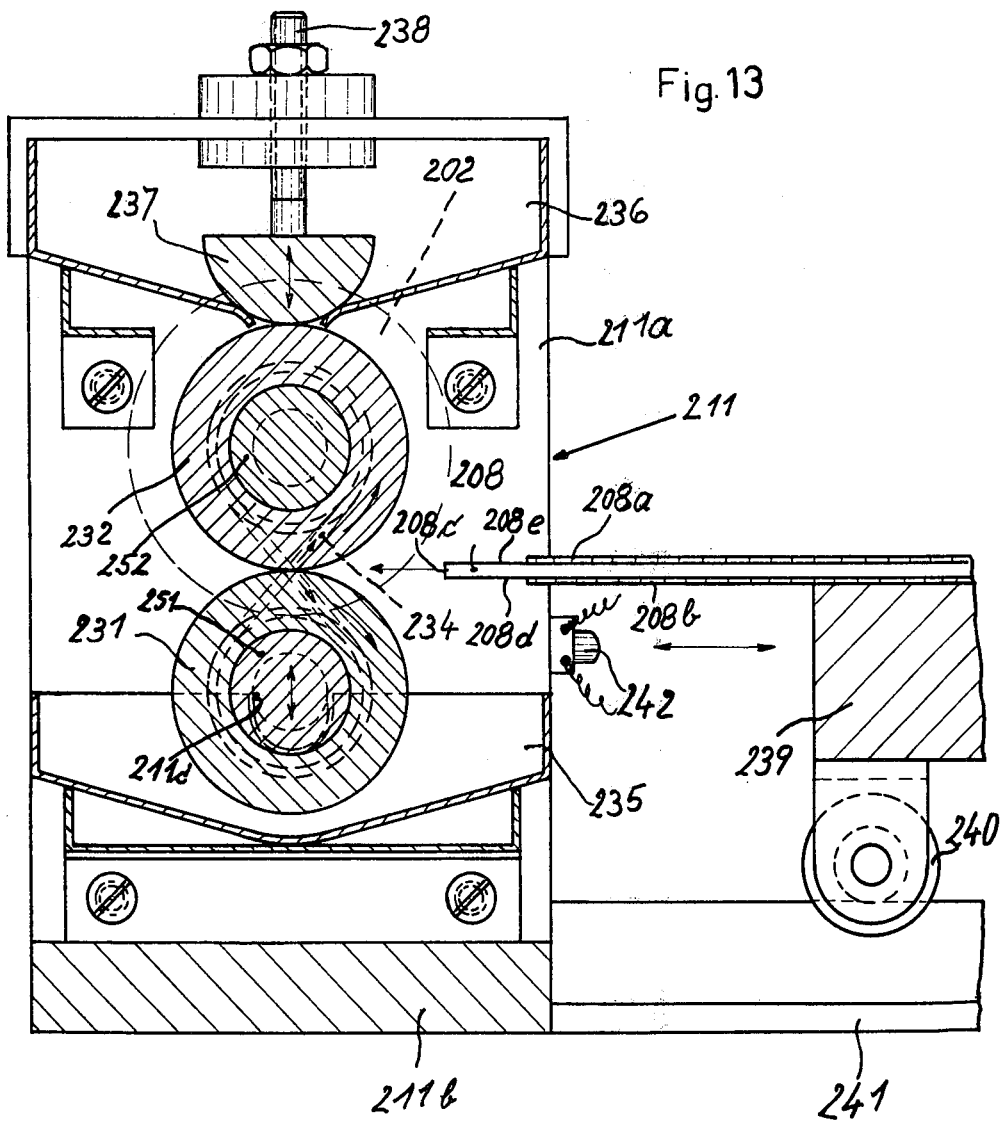
Figure 14:
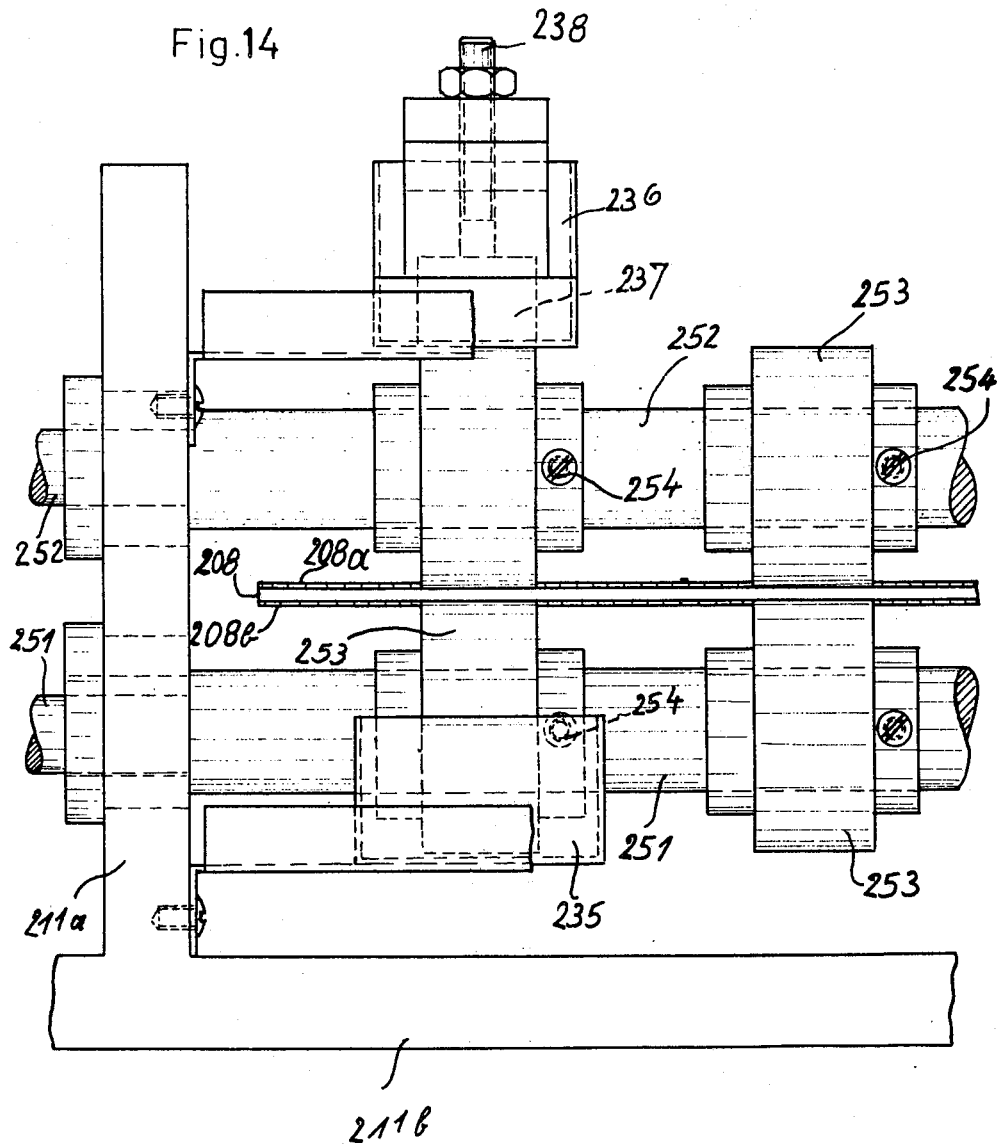
Figure 15:
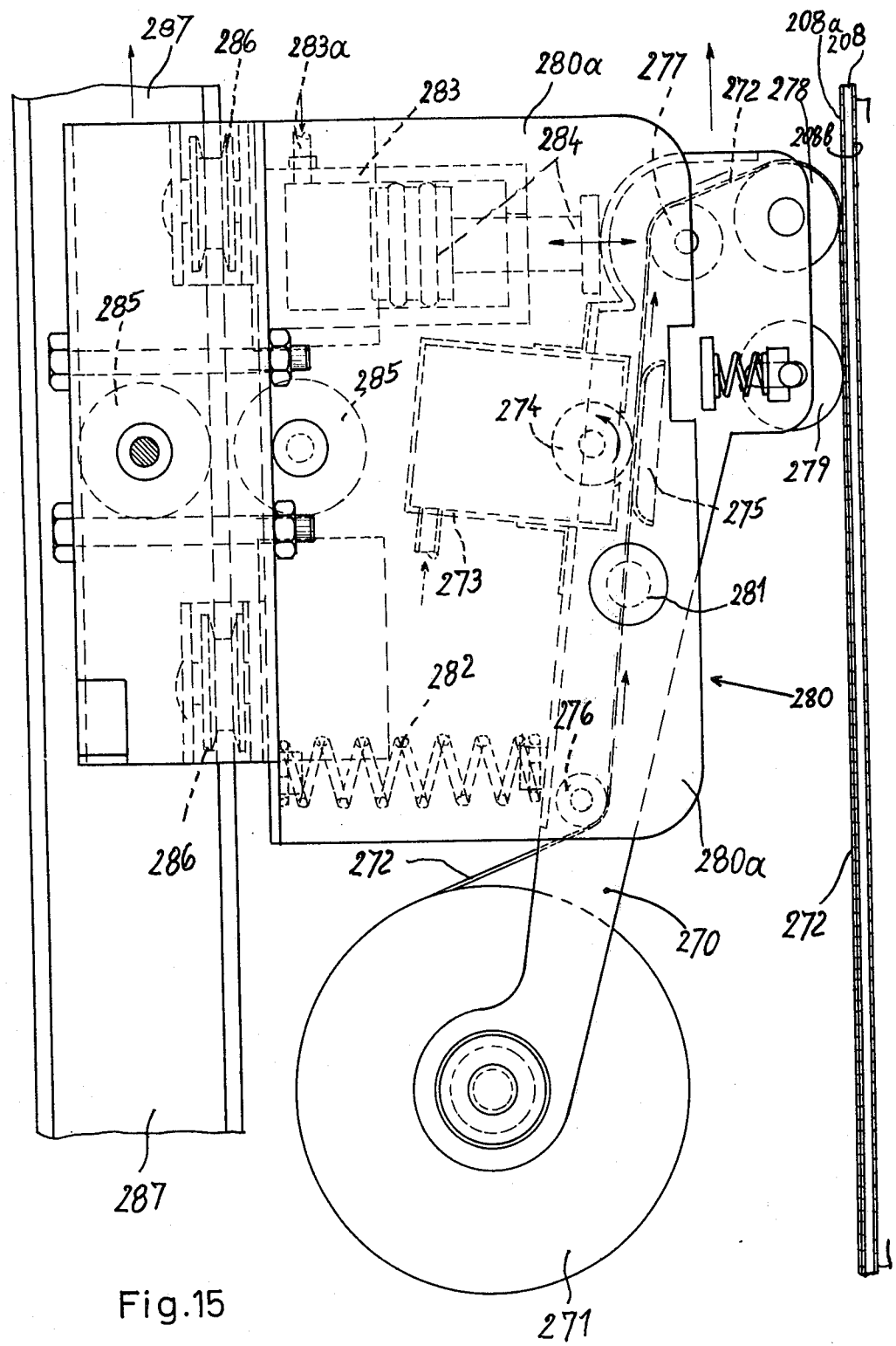
Figure 18:
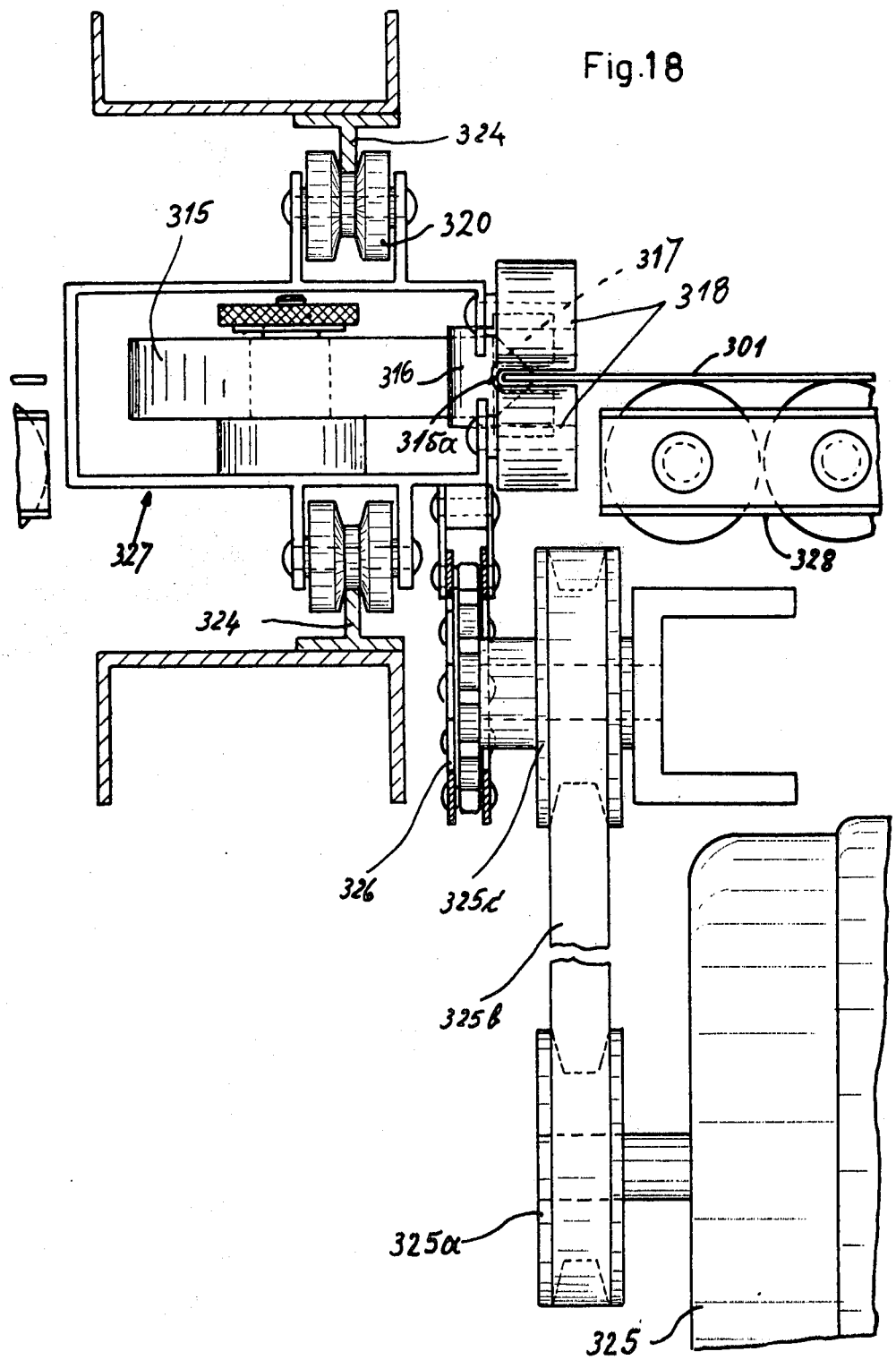
Figure 19:
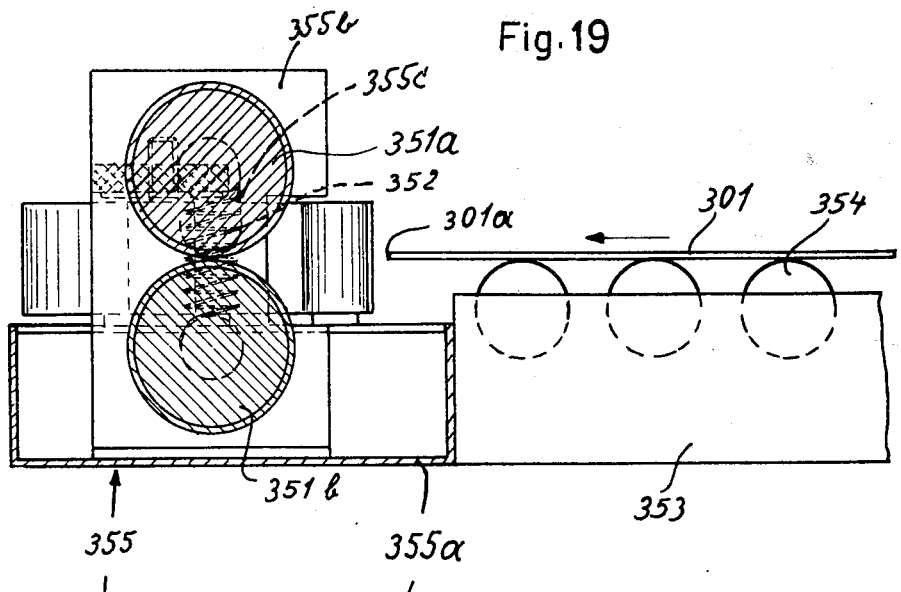
Figure 20:
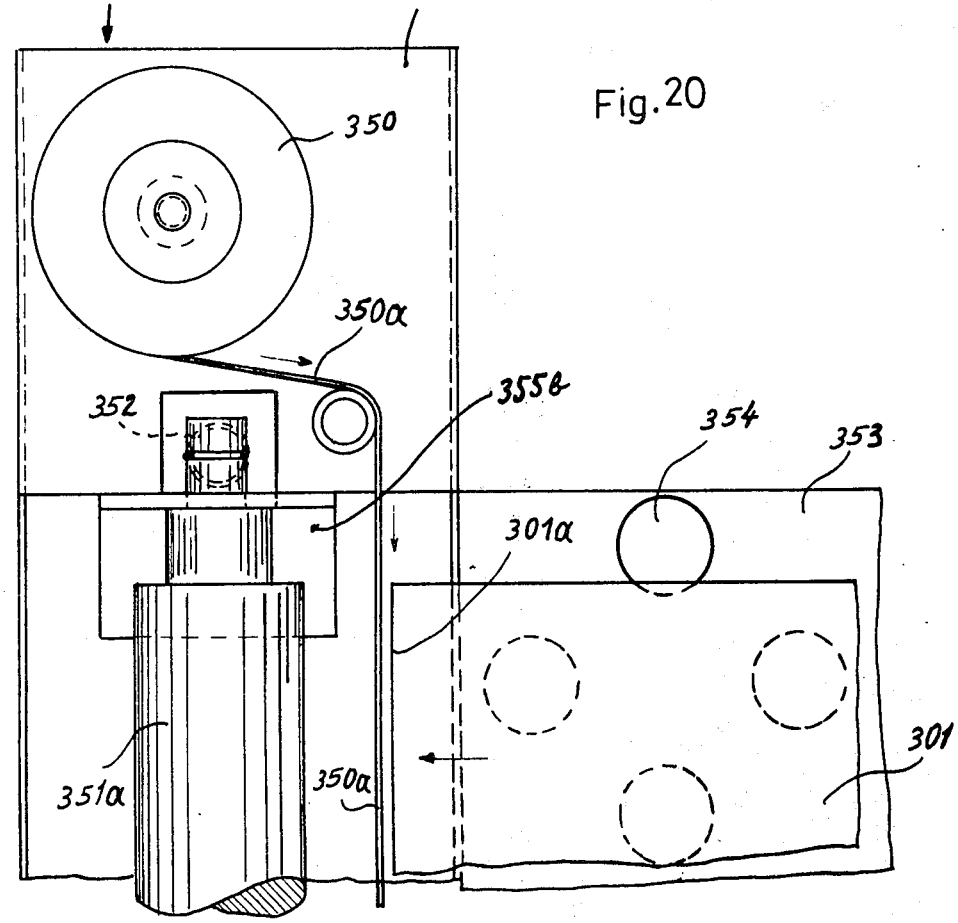
Figure 21:
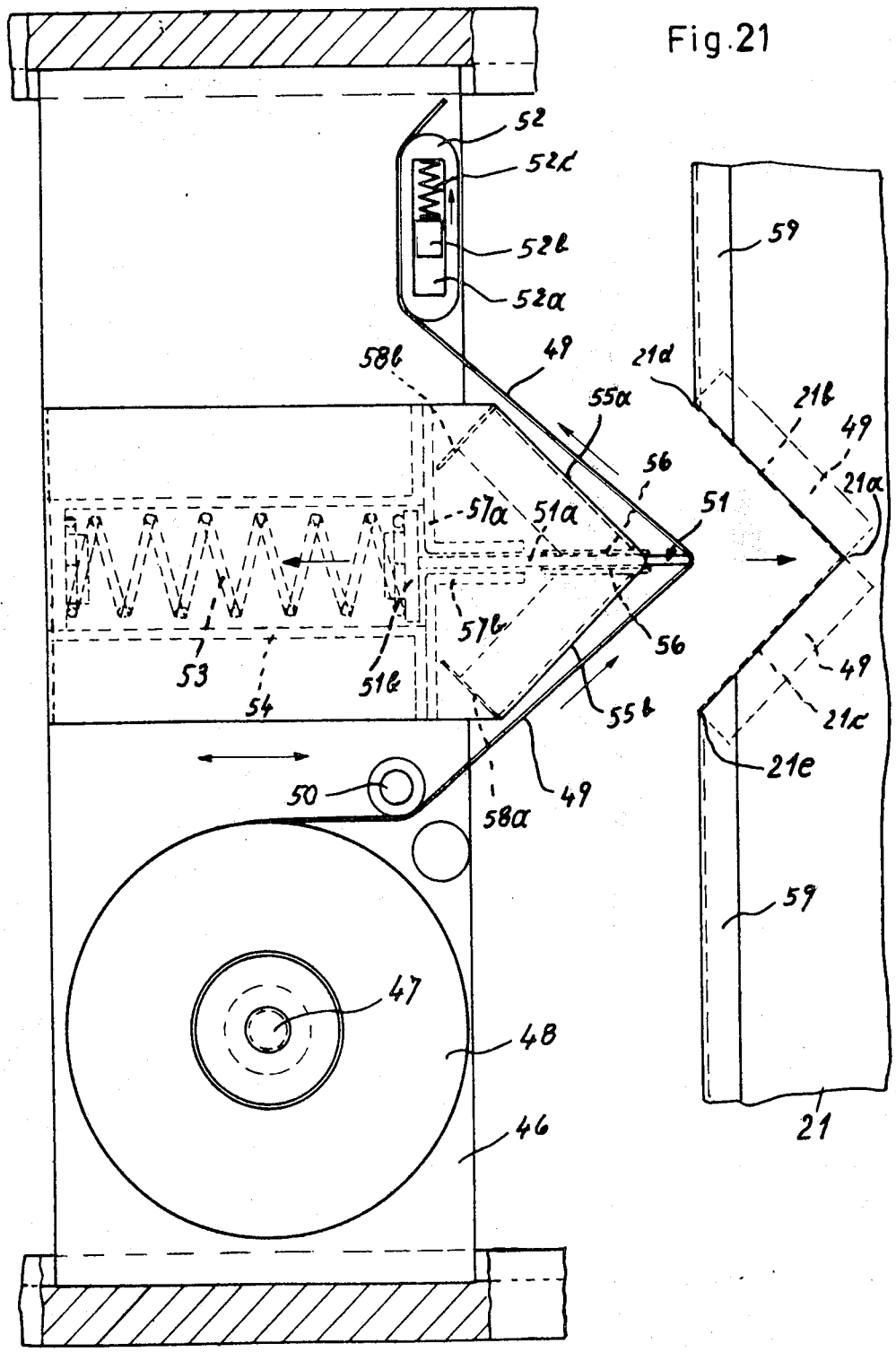
Figure 22:
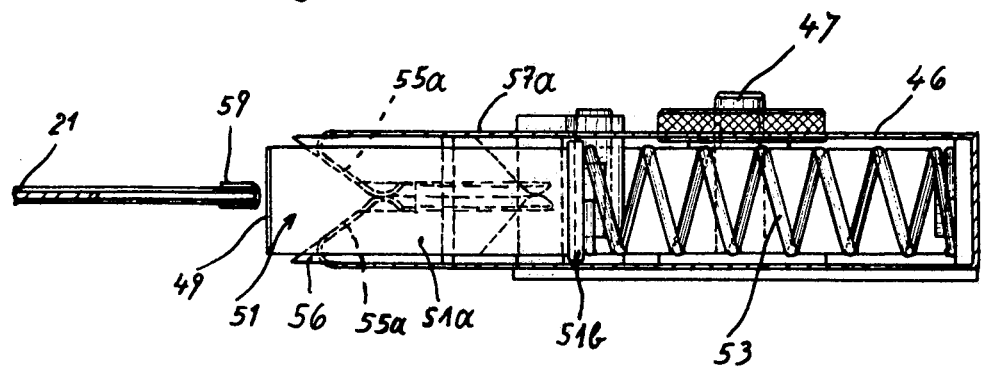
Figure 23:
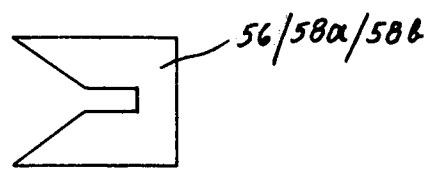
Figure 24:
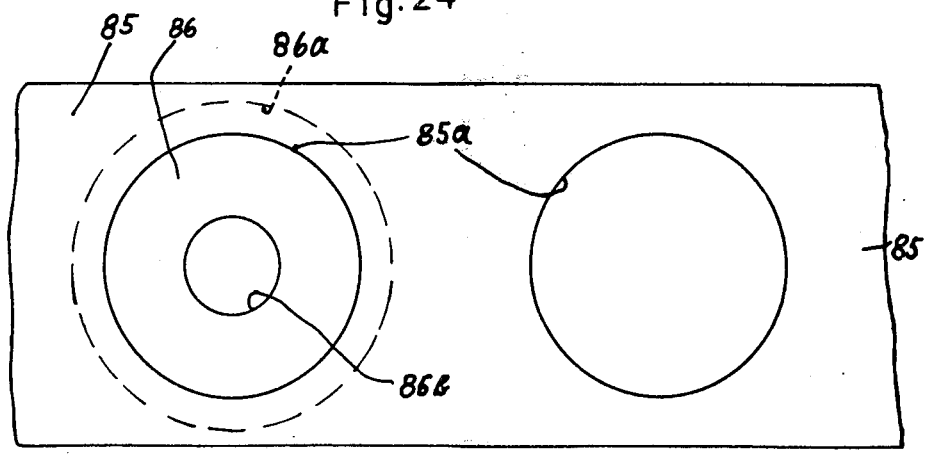
Figure 28:
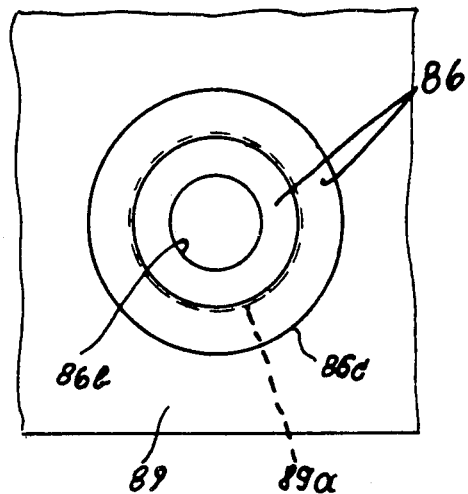
Figure 29:
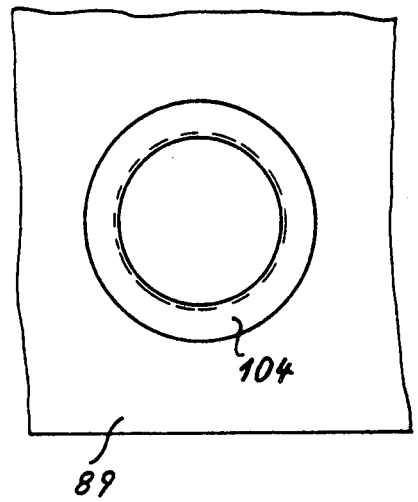
Figure 30:
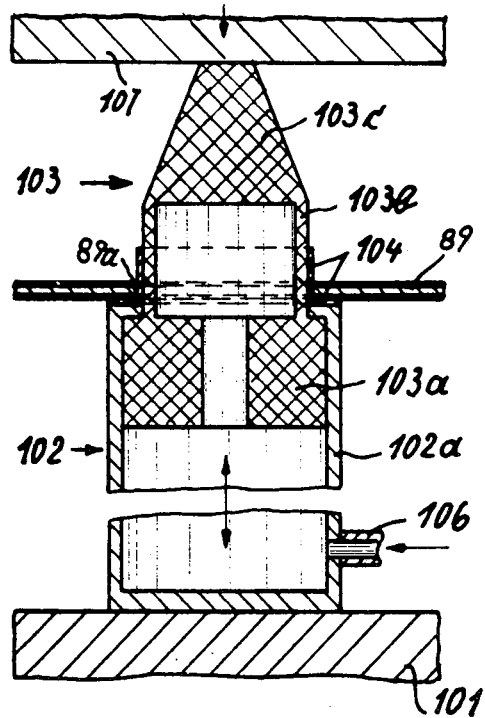
Figure 31:
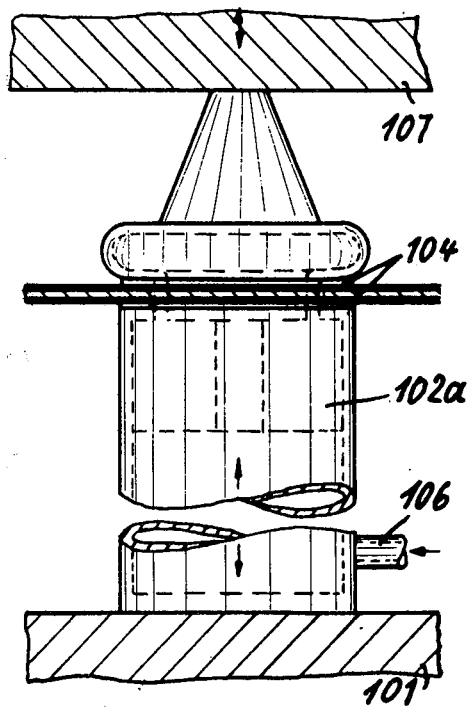

FIGS. 10 and 11 show a device for applying pasty agents with a horizontal roller, in elevation and plan view, respectively, FIG. 12 shows a similar device with vertical roller, in part-sectional elevation, FIG. 13 shows a similar device with a pair of rollers, in transverse section, FIG. 14 shows a similar device with roller portions for stripped strip-shaped zones, in front elevation, FIG. 15 shows a similar device with a tape to be applied, in side elevation, FIGS. 16 and 17 show a device for the covering of edges with a tape drawn off a reel, for sheet metal edges lying in the direction of transport, in elevation and plan view, respectively, FIG. 18 shows a similar device for sheet metal edges positioned transversely of the transport direction, in cross section, FIGS. 19 and 20 show a device for the covering of edges with a tape stretched out in front of presser rollers, in tranverse section and plan view, respectively, FIGS. 21 and 22 show a device for the covering of edges having receding portions, in plan view and transverse section, respectively, FIG. 23 shows a blade for making incisions into a tape, for a device according to FIGS. 21, 22, in elevation, FIG. 24 shows a tension belt with an adhesive disc, in plan view, FIG. 25 shows a device for the punching-out and pressing-on of adhesive discs, before the punching, in elevation, FIG. 26 shows the same device after the punching, in part-sectional side elevation, FIG. 27 is a view corresponding to FIG. 26 during the pressing-on, FIG. 28 shows a piece of sheet metal with a hole, covered by two adhesive discs, in plan view, FIG. 29 shows a piece of sheet metal with a hole, covered by a single adhesive ring, FIG. 30 shows a folding and pressing-on device for adhesive rings in sectional side elevation, during the folding-over, FIG. 31 shows the same device in side elevation when pressing-on.

FIG. 32 shows a welding device for a stretched-out tape, with infra-red radiator, in transverse section, FIGS. 33 – 35 show a similar device with hot air blower and a tape drawn off a reel, in elevation, plan view and transverse section, respectively.

Figure 38:
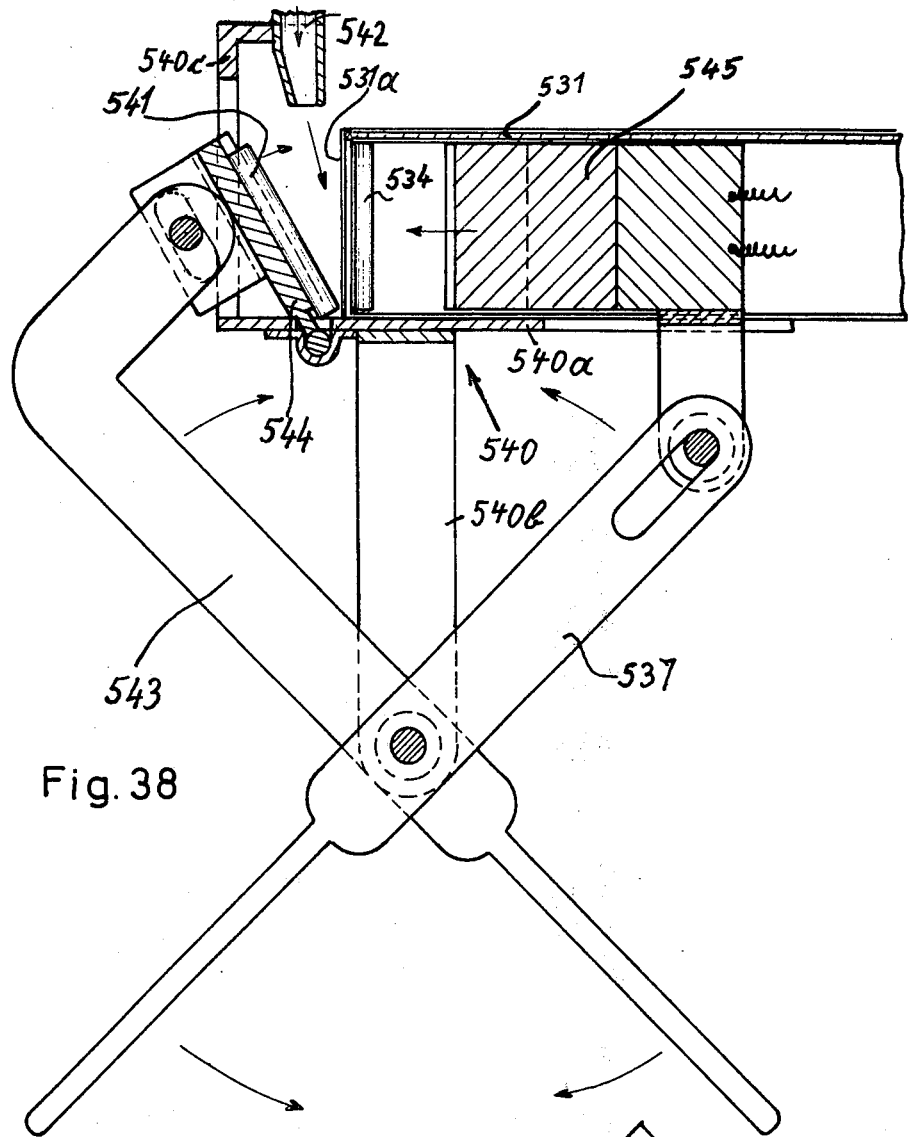
Figure 39:
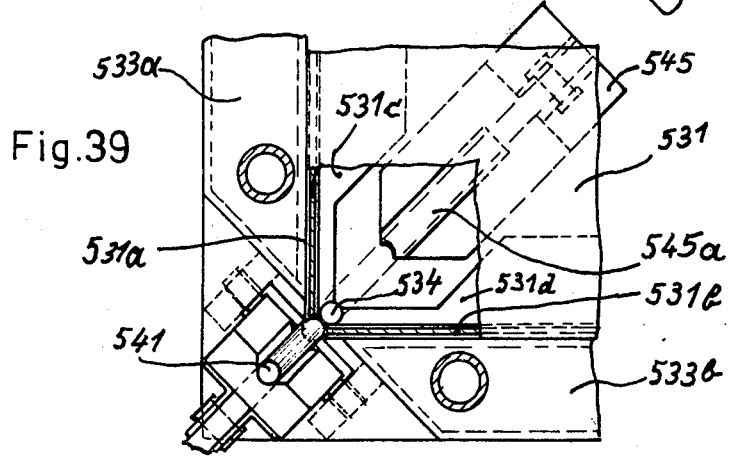
Figure 40:
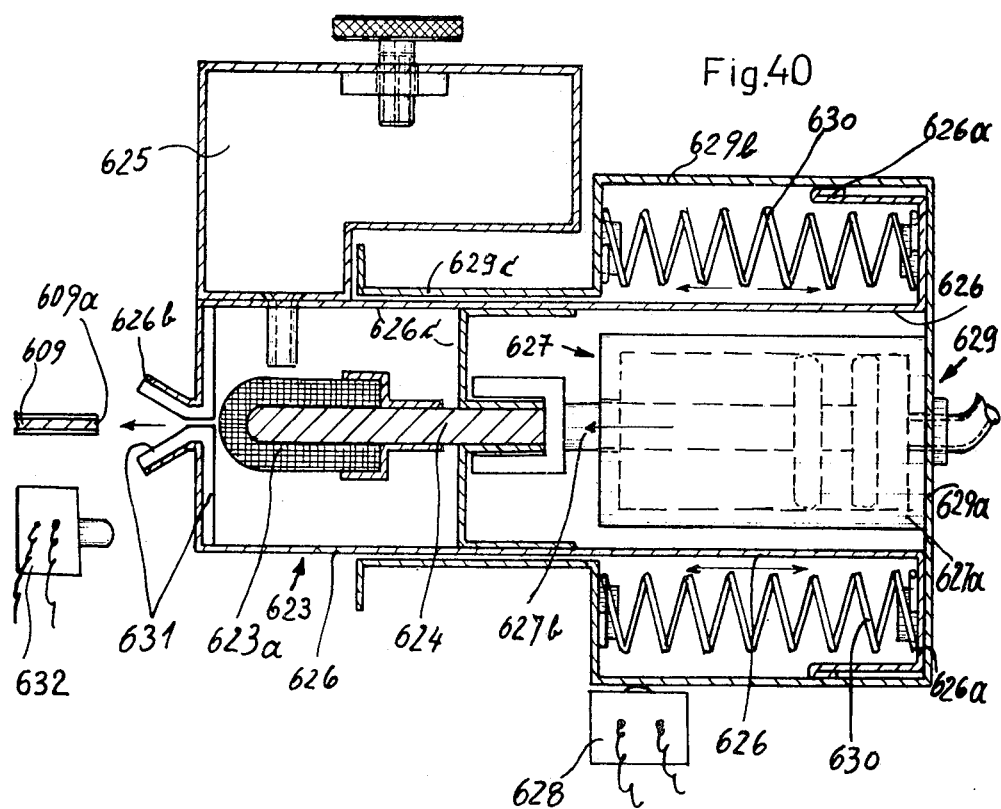
Figure 41:
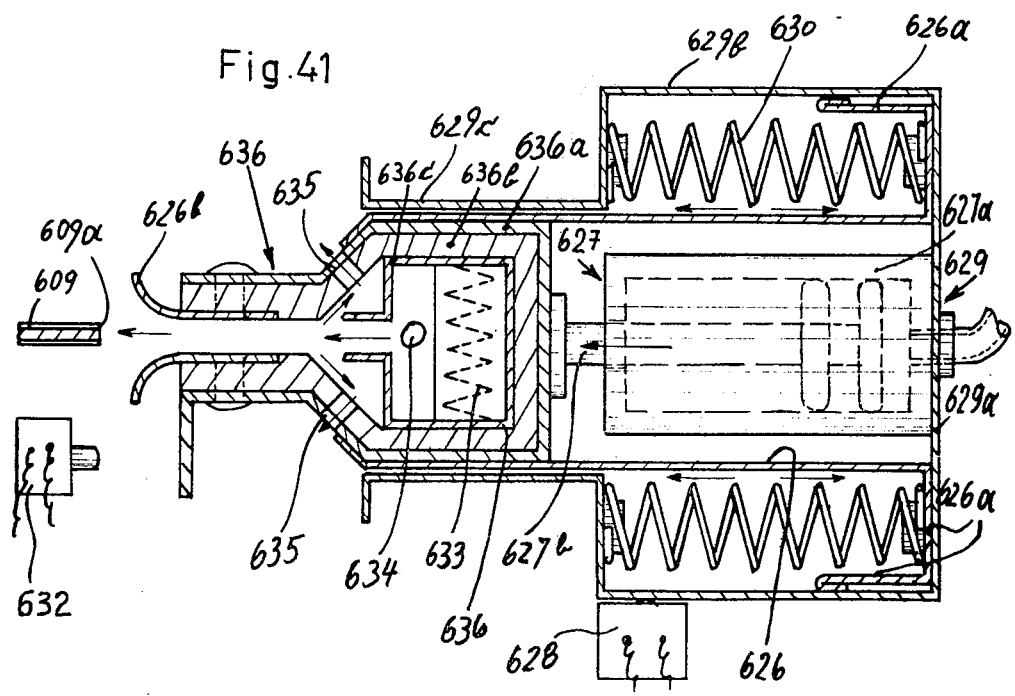
Figure 42:
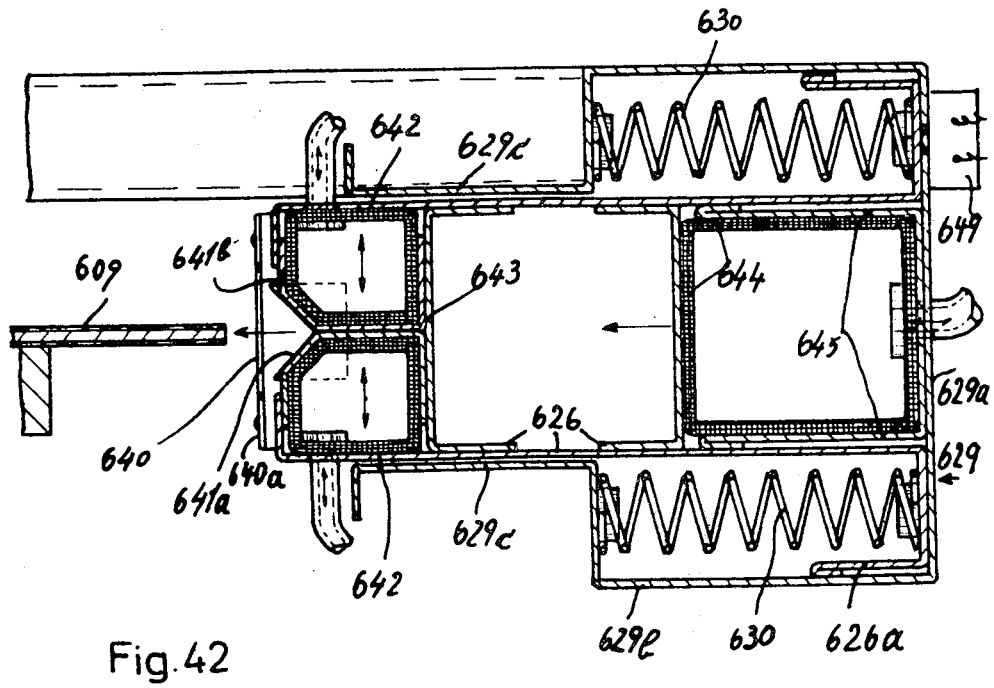
Figure 43:
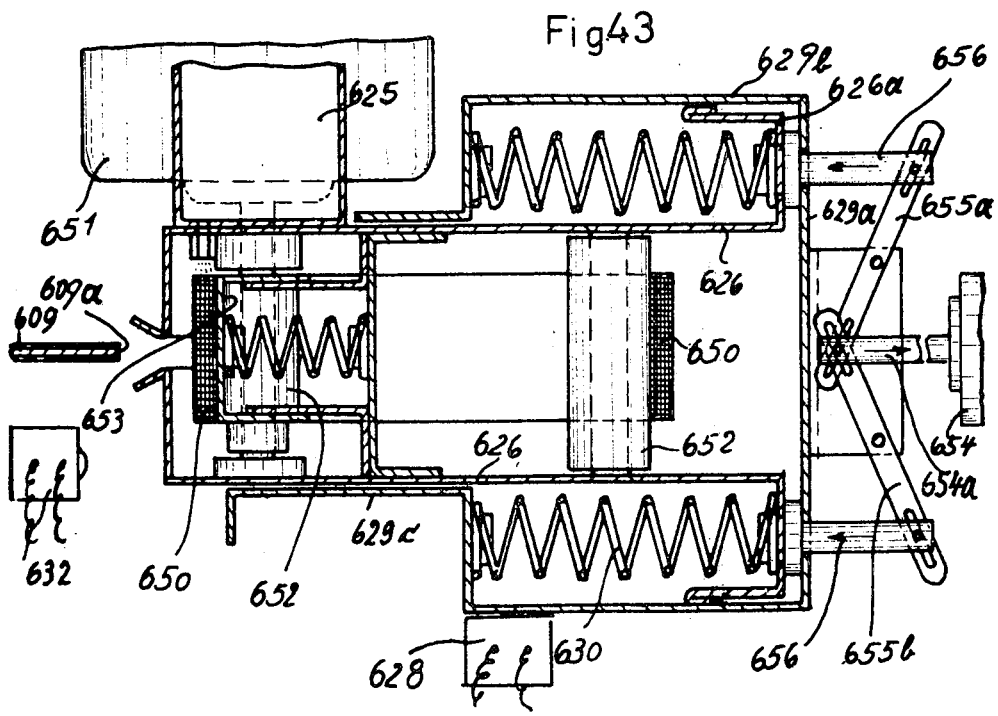
Figure 44:
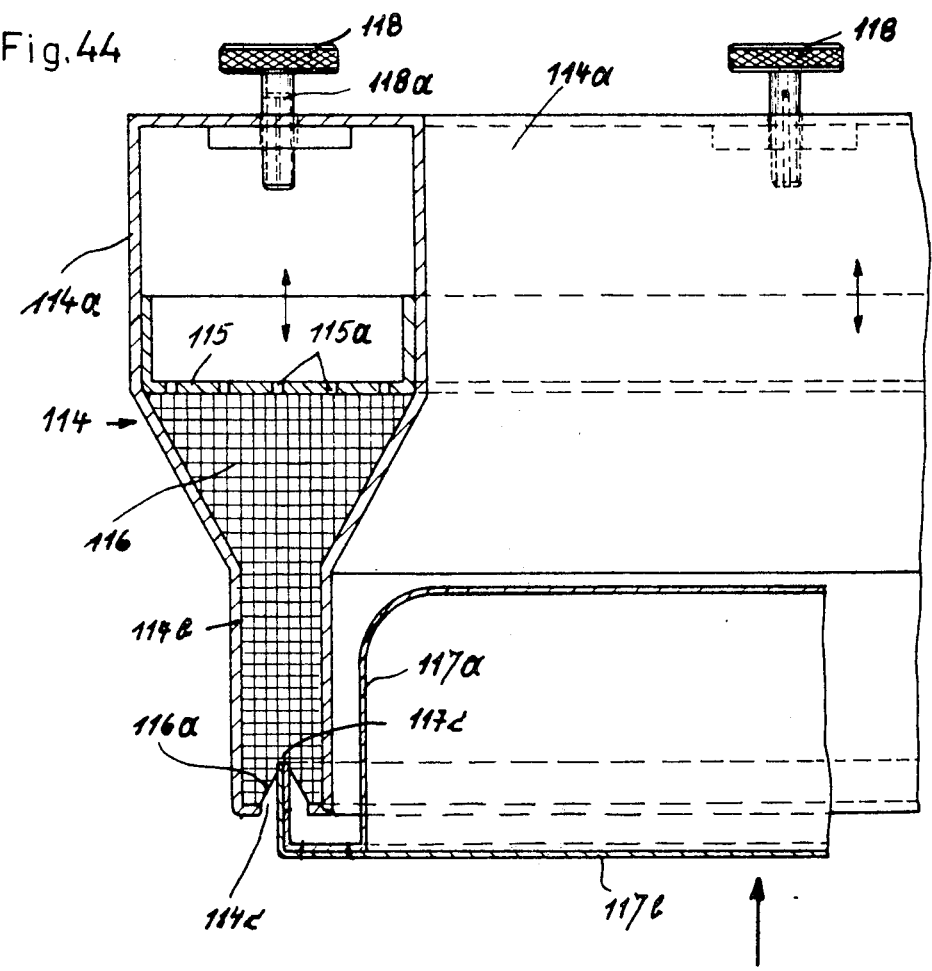
Figure 45:
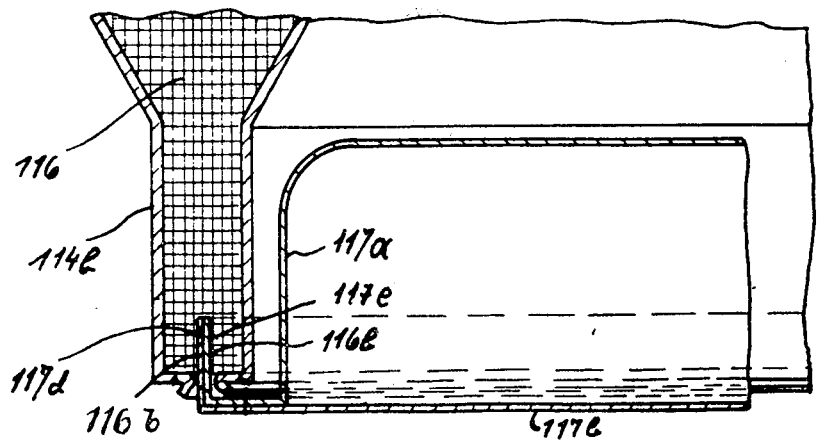
Figure 46:
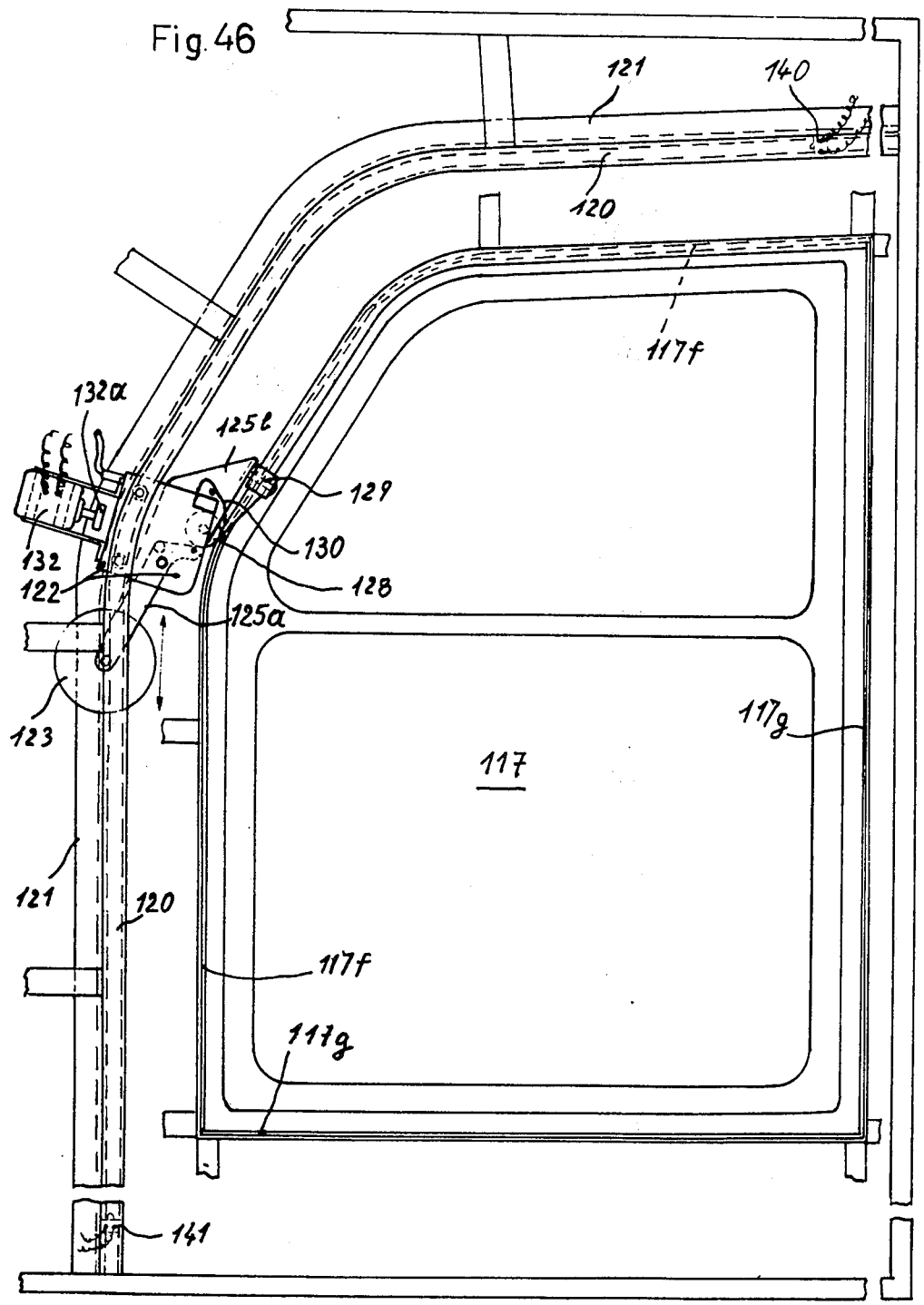

FIGS. 36 and 37 show a similar device with a weldable cord in elevation and plan view, respectively, FIGS. 38 and 39 show a welding device for a corner gap in sectional elevation and plan view, respectively, FIG. 40 shows a device for a sheet metal panel lying on a production line, with a compressed air advance device, for an applying device with sponge, in transverse section, FIG. 41 shows a similar device for a drying means, FIG. 42 shows an advance device with inflatable hose for a device for the covering of edges, FIG. 43 shows an electromagnetic presser device for an applying device with endless sponge belt, FIG. 44 shows a frame-shaped applying device with sponge for the edges of the door of a motor car body, in transverse section, FIG. 45 shows a similar device for the edges and adjacent margins, FIG. 46 shows a device with a rail and carriage for covering the curved edges of the door of a motor car body, in plan view.

Figure 47:
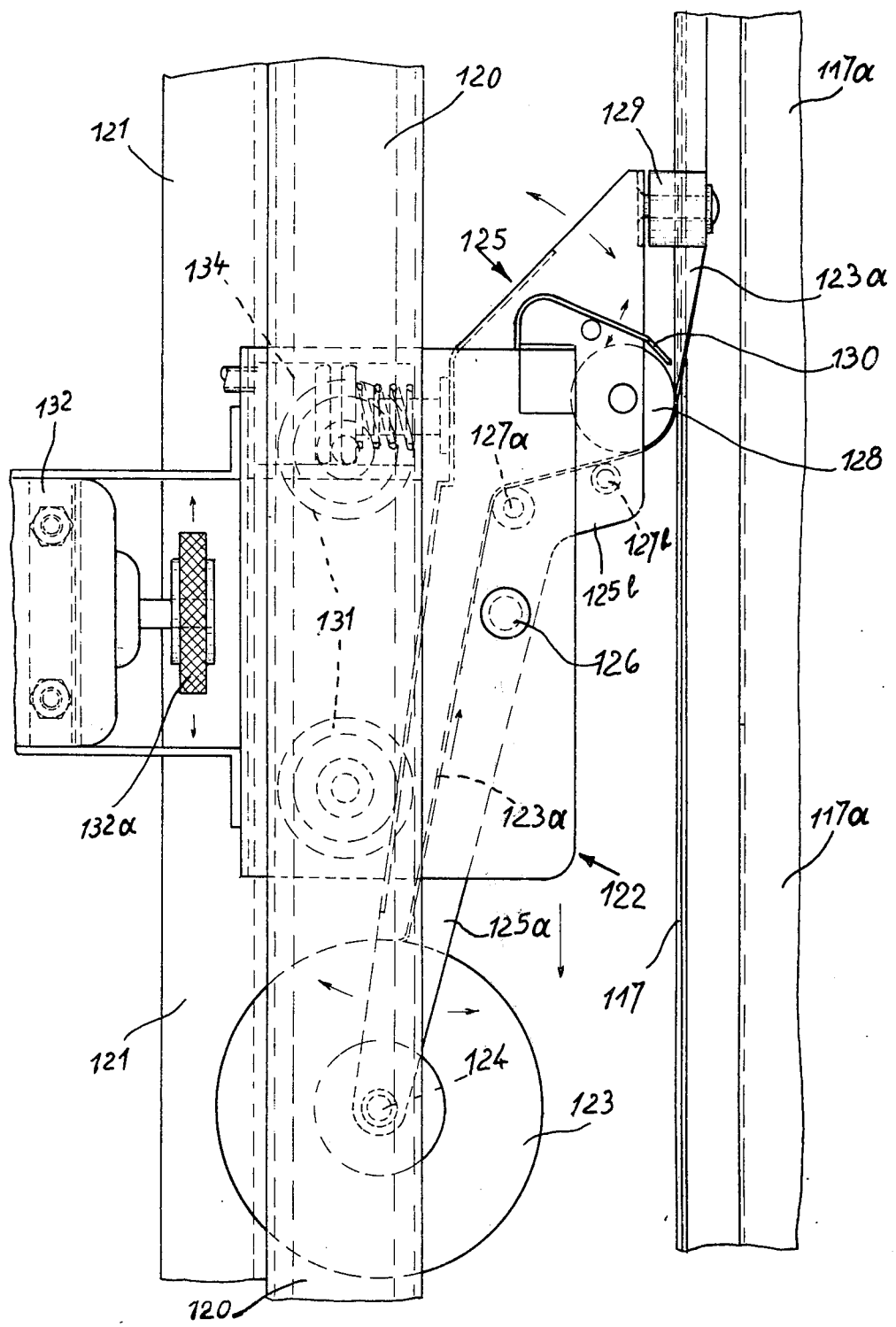
Figure 48:
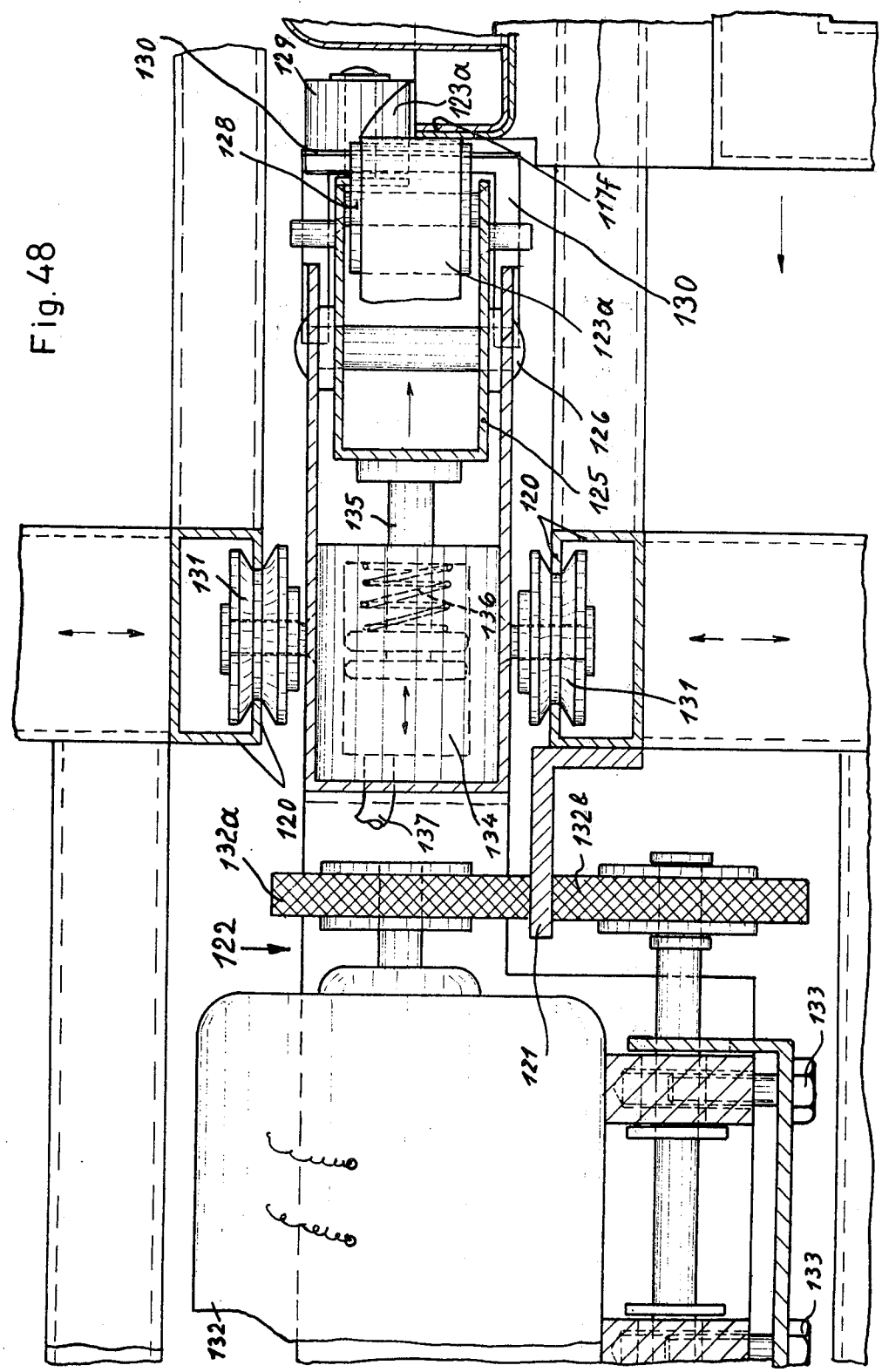
Figure 49:
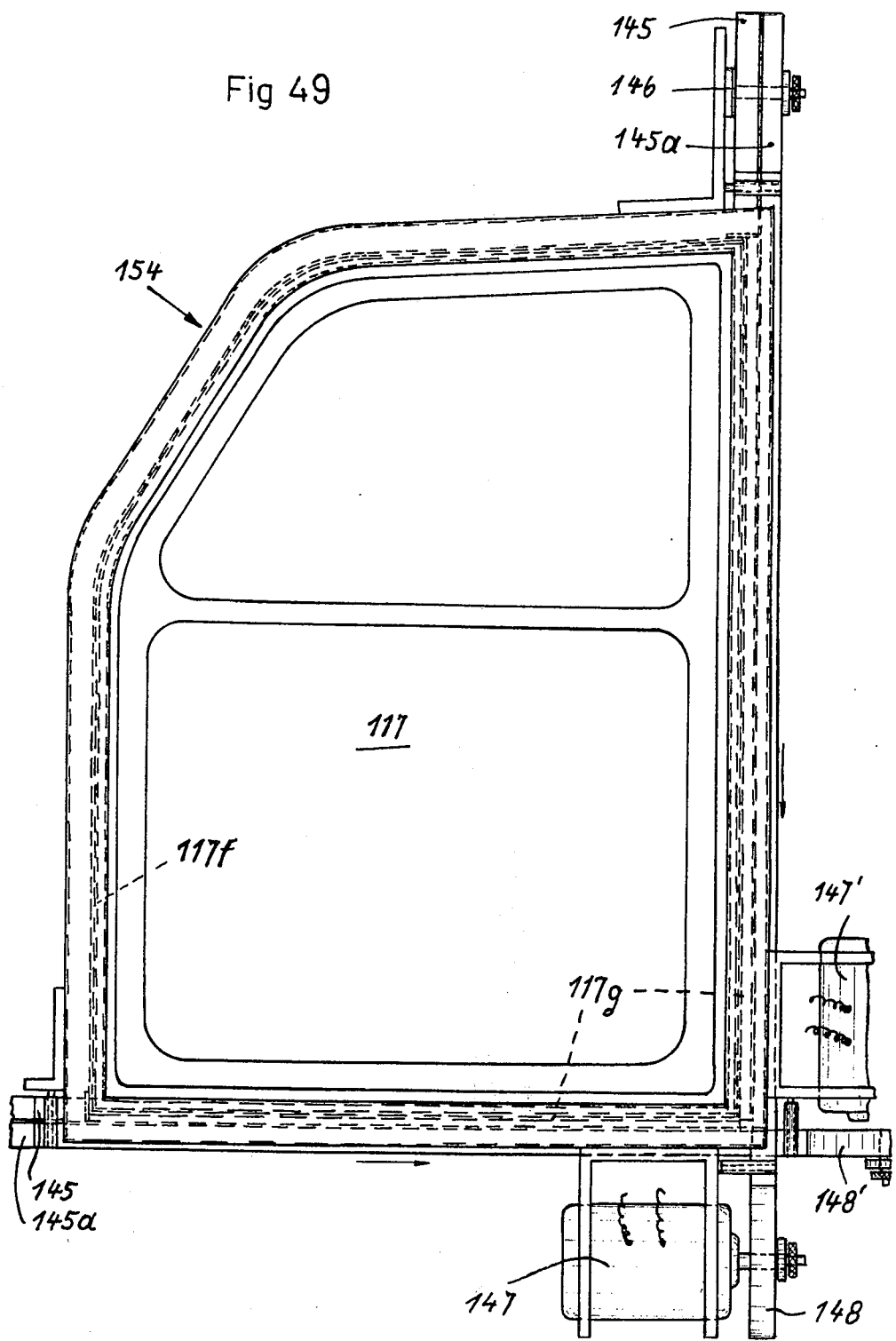
Figure 50:
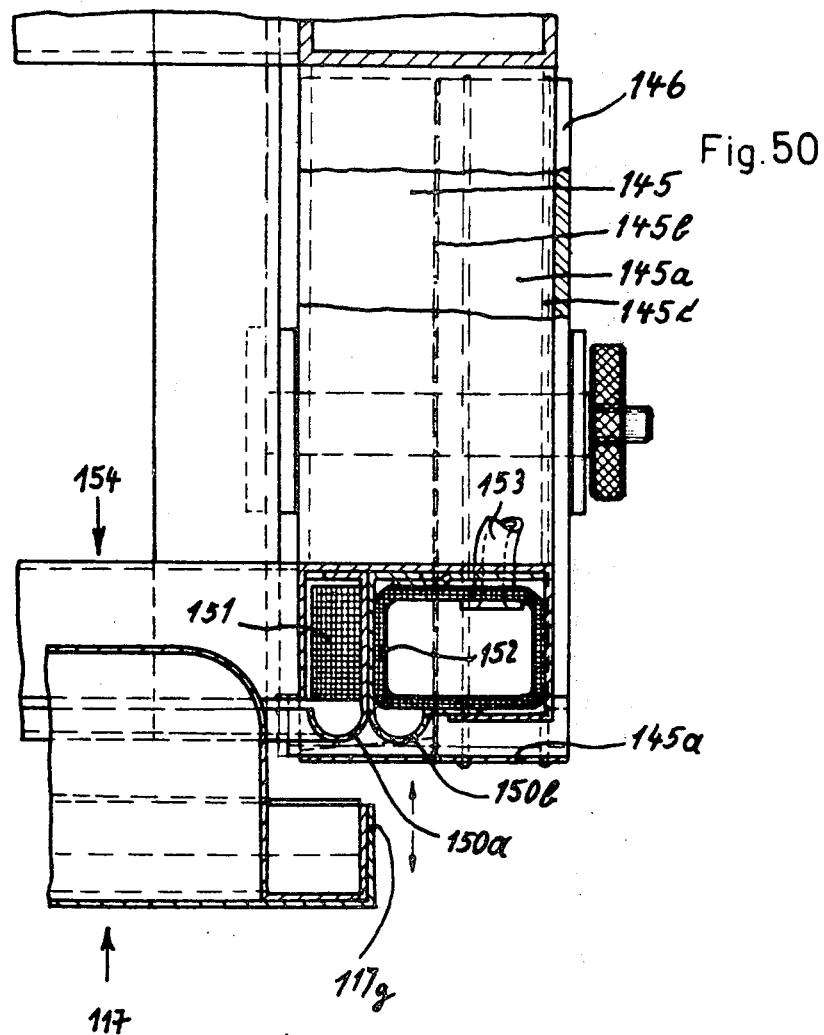
Figure 51:
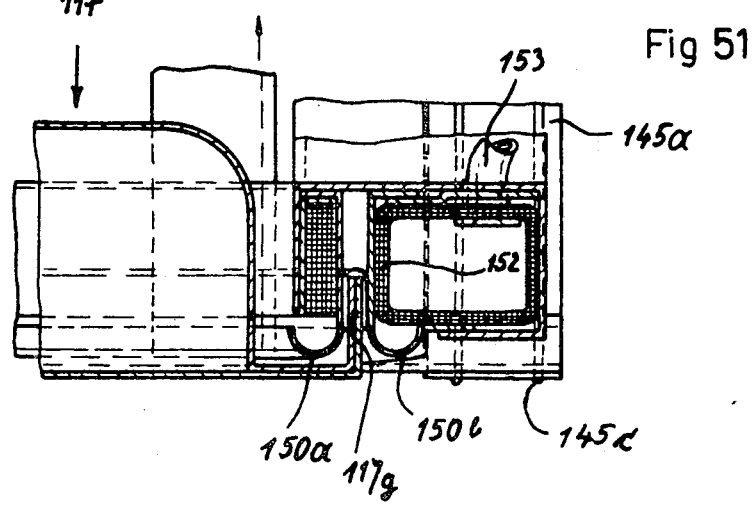

FIG. 47 shows on a larger scale the carriage with storage reel for the tape and drive, in plan view, FIG. 48 shows on yet a larger scale a transverse section of the rails, the carriage and the door of the motor car body, FIG. 49 shows two means fixed to a common frame, for stretching out an adhesive tape for covering the straight edges of the door of a motor car body, in plan view, FIG. 50 shows the frame, provided with a presser device for the margin, prior to the pressing operation, in transverse section, FIG. 51 corresponds to FIG. 50 and shows the stage of pressing the adhesive tape to the edges of the door of the motor car body.

Simple rust-protection is attained by applying liquid agents such as lacquer. In this operation, the visible adjacent surfaces, which are already covered with layers and have their final appearance, must not be affected by droplets or spray.

Figure 1:
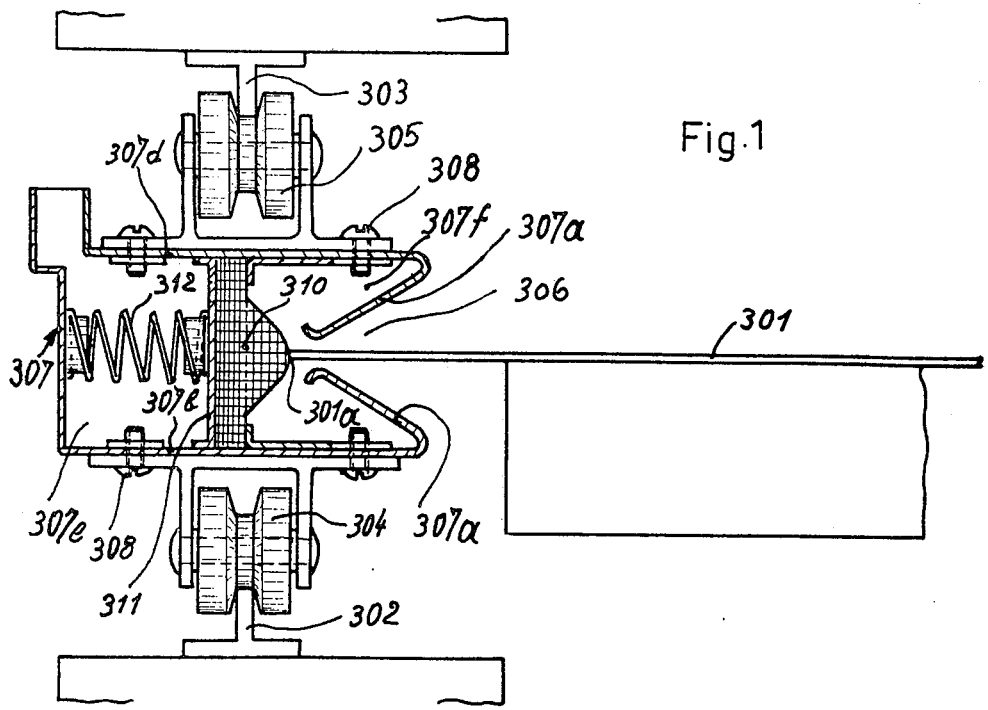
FIGS. 1 and 2 show a device for applying a rust-protective agent with a sponge to straight edges, in transverse section and plan view, respectively.
Figure 2:
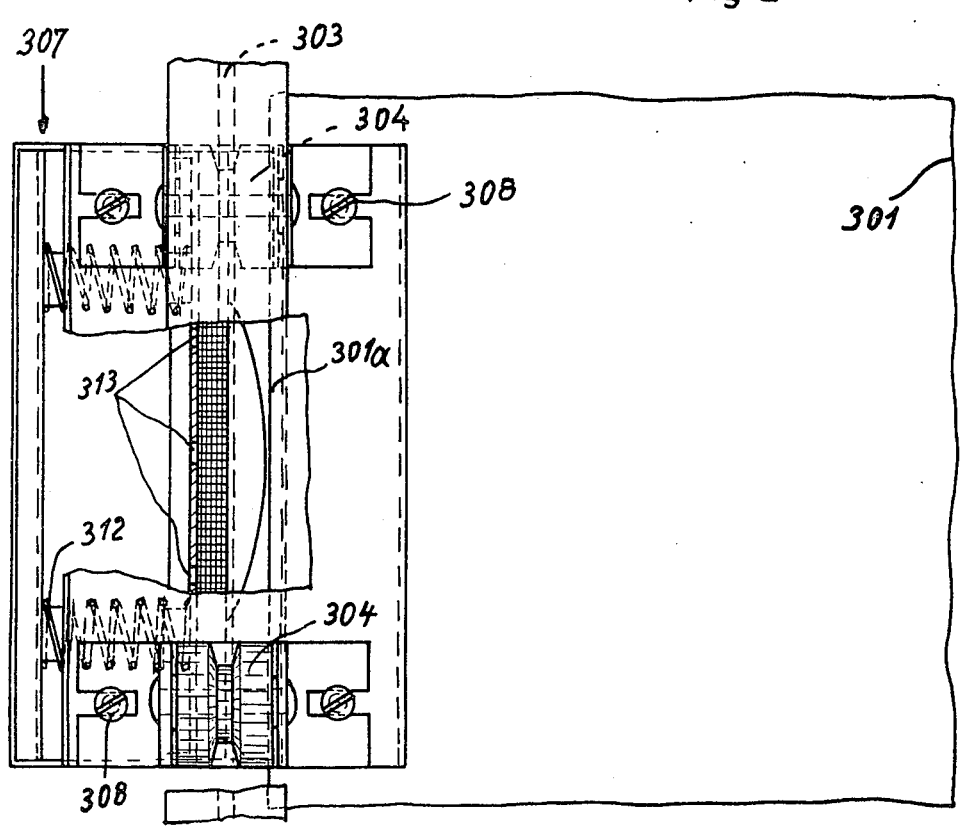

Such a device for applying a rust-protective agent is illustrated in FIGS. 1 and 2. A container 307 has on top a socket for filling in a liquid rust-protective agent e.g. a lacquer, and has on the right hand side an orifice 306 formed by inwardly bent resilient ledges 307a. The container is subdivided by a slidable partition wall 311, extending between the bottom 307b and top 307d, into a storage chamber 307e and an applying chamber 307f. The partition wall has bores 313, through which the agent penetrates into an absorbent material, e.g. a sponge 310. The partition wall with the sponge is forced by springs 312 sideways towards the edge 301a of a sheet metal panel 301. The sponge is cambered in the horizontal and vertical planes, in order that only the edge 301a be wetted, while the upper- and under-side of the sheet metal panel remains free of droplets. Moreover two brackets with rollers 304 are fixed to the bottom 307b, and two further brackets with rollers 305 are fixed to the top 307d, by means of screws 308. The rollers run with recessed rims on rails 302, 303 in such a manner, that the applying device is moved along a sheet metal panel 301, and that the edge 301a thereof can be covered with lacquer.

For greater numbers of products the sponge is constructed as a strip of the length of the edge, and is simply pressed on the edge. For very large numbers of products the sponge is arranged in ring-shape around the sheet metal panel, and the contour of the panel is coated by raising and lowering the same.

For sheet metal panels, which are moved along a oroduction line, the edges lying in the direction of transport may be coated by containers 307 fixedly arranged to the left and right of the transport belt. For sheet metal edges positioned transversely of the transport direction, a movable container 307 in accordance with FIGS. 1, 2 is provided.

Figure 3:
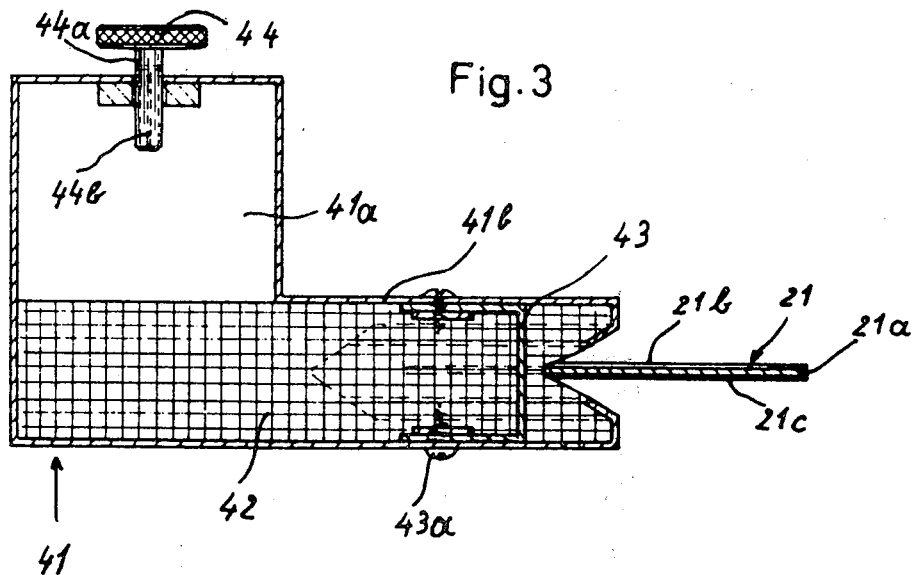
FIGS. 3 and 4 show a similar device for recessed edges, in transverse section and plan view, respectively.
Figure 4:
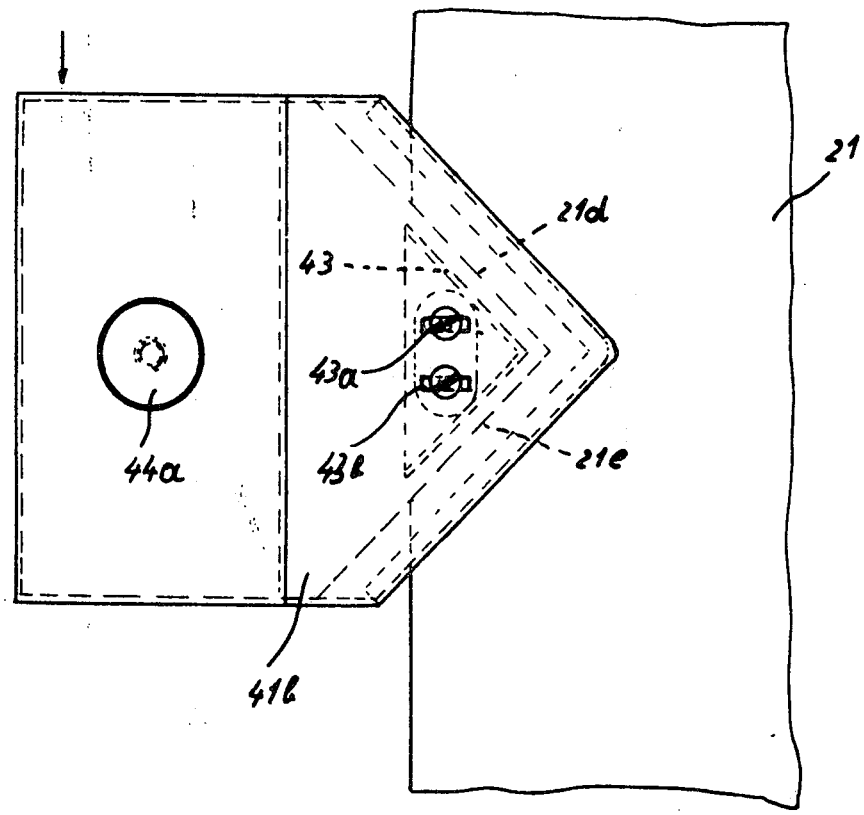

FIGS. 3, 4 show an applying device for the edges of sheet metal panels which have projecting and receding edge portions. A container 41 is composed of a storage reservoir 41a for a liquid rust-protective agent, and a lower, protruding applying portion 41b. The protruding applying portion 41b is adapted to the receding edge portions of a triangular punched cut-out having the edges 21d, e. The front wheels of the applying portion are drawn inward and form an orifice closed by an absorbent material, e.g. by a sponge 42. This sponge is supported by a U-profile 43, adjustable by means of screws 43a and slots 43b, and kimits the penetration of the sheet metal. The outflow of the agent is regulated by a screw 44 on the lid of the reservoir, which allows air to flow into the reservoir through a transverse bore 44a and longitudinal bore 44b. By pressing-on the sheet metal, the receding edges 21d, e are coated with the agent. Together with the upper and lower layer of synthetic material, 21b and 21c, respectively, this affords complete protection of the sheet metal panel 21a against corrosion.

For protruding corners of a sheet metal panel the orifice is provided with inwardly directed edges.

Figure 5:
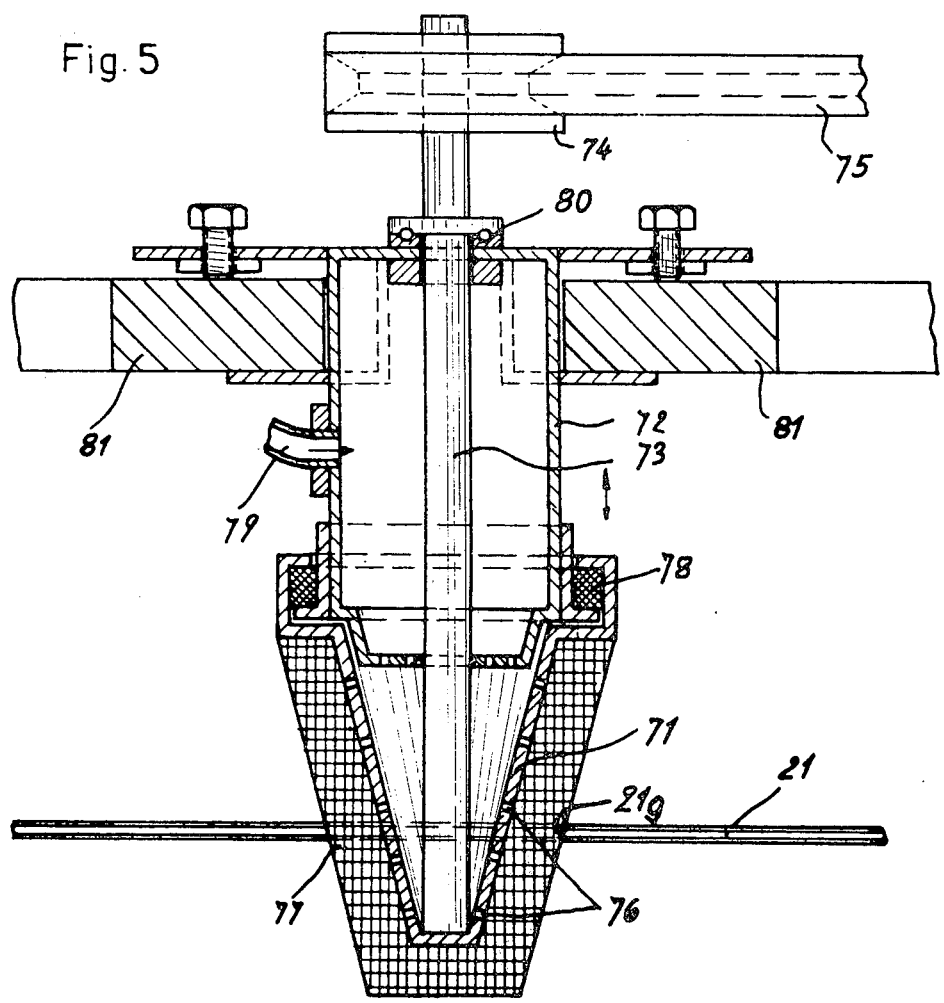
FIG. 5 shows a similar device for the edges of holes, in transverse section.

The cut edges of holes within the area of the sheet metal may be coated by means of cylindrical or conical sponges. The cone according to FIG. 5 fits into a circular stamped-out hole 21g of a sheet metal piece 21. The cone may, however, have oval, rectangular or irregular cross section, and may serve for the treatment of holes of various diameters.

In detail, the device comprises a hollow cone 71 with rows of perforations 76. The hollow cone serves as a reservoir for the liquid, and is covered with absorbent material 77. For comparatively viscous agents and more intense application thereof the cone may be driven by a motor. For this purpose the hollow cone 71 is mounted rotatably on a cylindrical storage reservoir 72, and sealed by a ring 78. A shaft 73 fixed to the bottom of the conical end portion 71 is supported on the cover of the reservoir by a ball bearing 80, and carries on its upper end a belt pulley 74 for a driving belt 75. The stationary reservoir 72 has a supply pipe 79. The agent reaches the sponge 77 through bores in the bottom of the reservoir and through the rows of perforations 76 in the rotatable hollow cone 71. The device is clamped, adjustably, on two carrier ledges 81. These carrier ledges can be raised and lowered mechanically.

Figure 6:
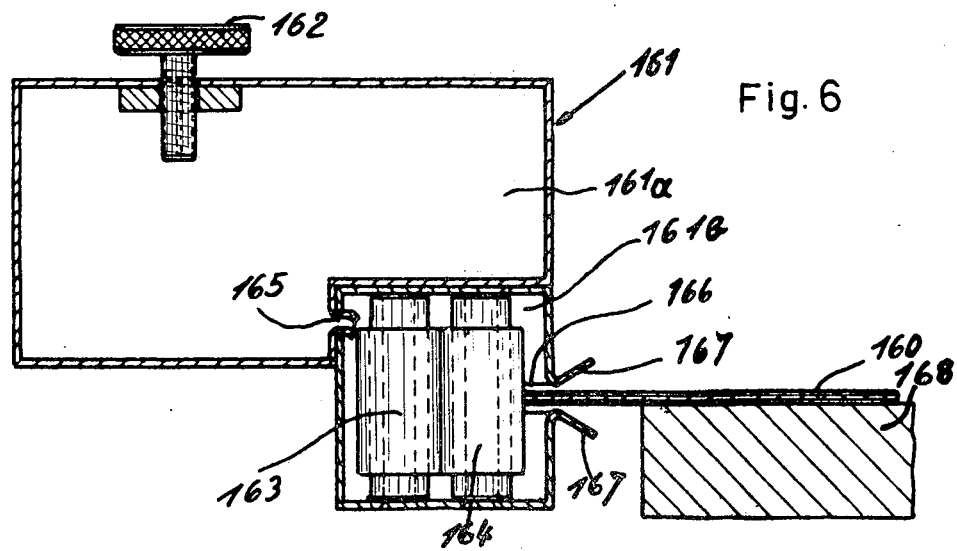
FIG. 6 shows an applying device with rotatable sponge rollers, in transverse section.

Uniform and reliable application of the rust-protective agent is attained by pre-distribution and by moving the absorbent material, so that always new portions of the sponge, freshly supplied with the agent, come into contact with the edges. In accordance with FIG. 6 such a device 161 comprises a storage reservoir 161a with regulator screw 162, a drip orifice 165 and an applying chamber 161b. Underneath the drip orifice 165 a transfer roller 163 is journalled on a vertical axle, and contacts an applying roller 164 journalled likewise. In front, the applying chamber 161b has a slot 166 and two resilient closure ledges 167, which may be covered with felt. In front of the closure edges there is a table 168 with the sheet metal panel 160 resting on it. The sheet metal panel is forced by the closure ledges against the applying roller 164, and is moved perpendicular to the plane of the drawing. Thereby, the applying roller 164 is rotated, and with it also the transfer roller 163, whereby some agent is supplied continuously to the cut edges. Alternatively, the sheet metal panel may be stationary, and the device may be moved.

Figure 7:
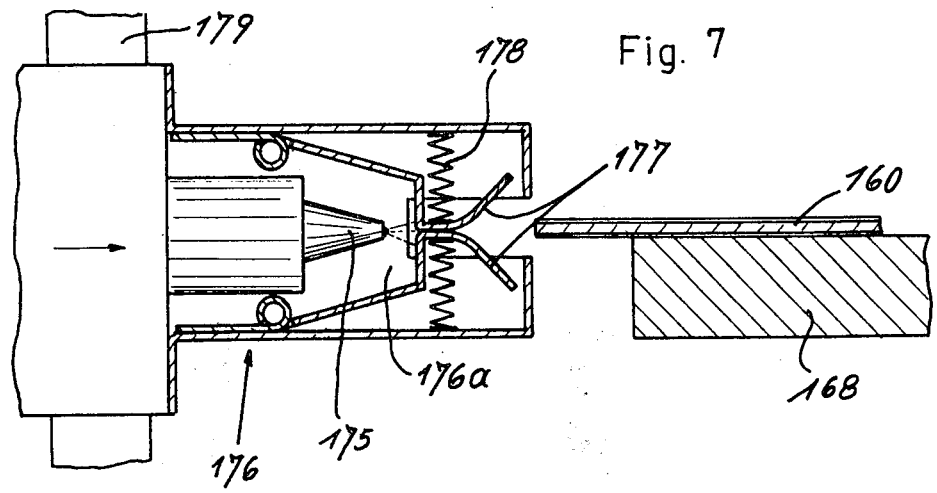
FIG. 7 shows an applying device with spray nozzles with a covering closure ledge, in transverse section.

When the rust-protective agent lends itself badly to being applied by an absorbent material, spraying devices are used. The device according to FIG. 7 comprises a casing 176, which has on the right hand side a slot for introducing the sheet metal panel 160. In this casing, a spraying chamber 176a is divided off by a pair of resilient closure ledges 177 wherein a spray nozzle 175 is mounted. The closure ledges may be kept closed by the additional aid of compression springs 178. The sheet metal panel penetrates only so far between the closure ledges 177 that its edge is flush with the inner ends of the closure ledges. The sheet metal panel may be pushed along a nozzle, or conveniently, a series of nozzles 175 so arranged, that the edge is covered with lacquer in one operation. The device is fixed on a carrier bar 179 and, together with the latter, is pushed mechanically against the sheet metal panel resting on a support 168.

Figure 8:
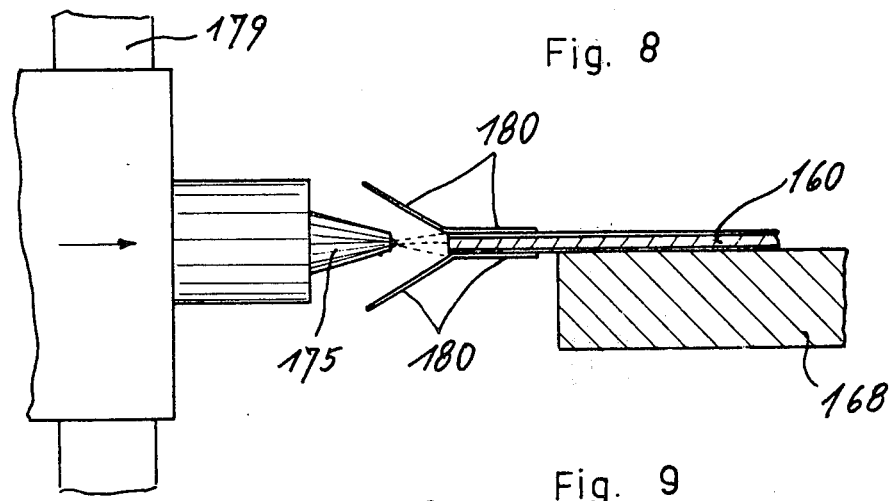
FIG. 8 shows a similar device for the covering of edges with an adhesive tape.

In a simpler embodiment according to FIG. 8 the layers of the sheet metal panel 160 are protected by tapes 180 cemented on to it. These tapes are cemented on only over half their width; their protruding portions are turned up so as to flare out and to form a protective hood for the nozzle 175.

Figure 9:
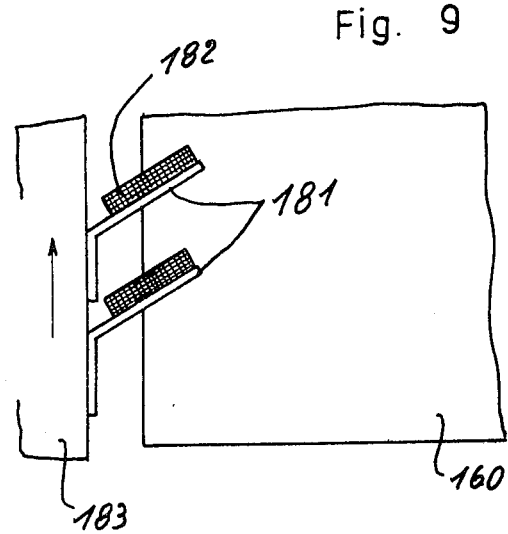
FIG. 9 shows a stripper in plan view.

In accordance with FIG. 9 an excess of the rust-protective agent, which may have got to the upper- or under-side of the sheet metal panel 160 can be removed by strippers 181 with felt lining 182. These strippers are mounted on a carrier ledge 183.

When the areas stripped of a layer are to be coated as thickly as the adjacent layers, pasty adhesives, putties, metal cements or the like are applied in the form of films. Preferably, two-components agents are used in order to attain better adhesion. Their use is more difficult, since they are lasting in the mixed condition for a short period only, the so-called "pot-time". The components coming into contact with the substances must be cleaned after the lapse of the pot-time, and for this purpose they must be capable of being readily assembled and dismantled. The coating substances may have the same colour as the previously applied layers. After the setting of the coating substances the same form a uniform surface, and protect the sheet metal from corrosion.

For the purpose of applying such pasty substances, smooth rollers or circulating belts are provided. The substances may also be applied to tapes of synthetic material, and be cemented together with the tapes to the work piece. The applying rollers may be arranged parallel or perpendicular to the plane of the sheet metal.

In accordance with the first embodiment illustrated in FIGS. 10, 11 a roller journalled at one end and positioned horizontally dips into a trough 204 containing the substance to be applied, this roller being driven by a motor 202. A distributor 205, which is mounted rotatably and is adjustable by means of a nut 206, determines the thickness of the layer 201a of the substance. The roller is pushed over a spindle 203 and is held there by a screw 216. The spindle 203 is journalled in a casing 211a, which carries also the driving motor 202. The casing is fixed to a frame 211b, c, d, e of a carriage supported by rollers 214. The frame carries an angle profile 212 as a support of a trough 204 containing a rust-protective agent, whose other side rests on a detachable support ledge 213. A sheet metal panel 208 rests on a supporting table 207, which panel is provided on top and bottom with a layer 208a, b, respectively. The un-coated edge 208c is directed towards the rollers and lies so high that, when advancing the device with rollers 214 running on rails 215, the lower corner of the edge contacts the roller tangentially on top or at the upper third. In the latter case, the lower corner of the edge scrapes off the rust-protective agent and fills the triangular gap between corner and roller. Then the device is withdrawn. By a short advance of the deivce, the edge 208c is coated.

When strip-shaped blank areas, e.g. on the margins of interwelded components, are to be coated, an upper supporting table 209 is used. The underside of the work piece 210 resting on it is contacted by the upper side of the roller, and thus provided with a rust-protective agent. This may be done in the direction of movement of the roller or in the opposite direction, for which purpose the motor may be constructed for left hand or right hand run.

For the purpose of cleaning, the roller 201 is to be drawn off the spindle 203 forwardly, after unscrewing the screw 216, and likewise the distributor after unscrewing the nut 206. After detaching the support ledge 213 the trough 204 can be pulled out.

A further coating machine is illustrated in FIG. 12, which machine is suitable for the coating of edges positioned transversely of the direction of transport of the sheet metal panels. A vertically positioned applying roller 221 and a supply roller 222 arranged parallel and adjacent to it dip with their lower ends into a trough 223 containing a rust-protective agent. The supply roller lifts the rust-protective agent by means of a screw thread 222a and transfers the same to the applying roller 221, aft of which a distributor 224 guides the rust-protective agent to the level of the surface to be coated, and determines the thickness thereof. The two rollers are pushed over spindles 203 and 203a, respectively, and are kept there readily detachably by means of nuts 216, 216a, respectively. The spindles are journalled in the top 225a of a casing 225. The spindle 203 is driven by a motor 202, and drives the spindle 203a in the same sense of rotation by means of pulleys and a belt 227. The top 225a of the casing is connected with the bottom 225b thereof by walls 225c, d. On the underside of the bottom, a chain 226 and rollers 214 are arranged, in order that the device may be guided on the rails 215 along the surface to be coated, which in this case is an edge 208c of a sheet metal panel 208 covered with layers 208a, b. The sheet metal panel lies fixedly on a support 207. The supply roller 222 raises the rust-protective agent and transfers the same to the applying roller 221. The distributor determines the thickness of the layer. Upon continued rotation the applying roller 221 contacts the work piece 208 and coats the same, while the machine is pulled along the edge of the work piece.

A third embodiment is illustrated in FIG. 13. The coating machine comprises two long rollers 231, 232, which are arranged one above the other. The lower spindle 251 is journalled in a vertical slot 211c and is pressed against the upper roller 232 by springs. The roller 231 of the lower spindle dips into a trough 235 containing a rust-protective agent. Above the upper roller 232 a trough 236 is arranged, whose outlet opening is controllable by means of a ledge 237 by the aid of a screw 238. The spindle 252 of the upper roller 232 is driven by a motor 202, and the lower spindle 251 is driven by a crossed rubber belt 234, so that both rollers turn towards the work piece at the contacting sides. The rollers are journalled in side portions 211a of the structure 211, which has a bottom plate 211b. The troughs 235, 236 rest on angle profiles, which connect the side portions 211a with each other. In front of the machine lie rails 241 for a work piece transport carriage 239 running on rollers 240. The carriage 239 carries the sheet metal panel 208 coated with layers 208a, b, which had been removed from the left hand side margin. The stripped zones 208e, c, d are to be re-coated. For this purpose the stripped margin is pushed between the rollers, where it is covered with the rust-protective agent, until the carriage 239 abuts an electric end switch 242, whereby the coated sheet metal panel is redrawn.

A somewhat modified embodiment is shown in FIG. 14. It serves for the re-coating of stripped strip-shaped zones. On spindles 251, 252 lying one above the other the roller portions 253 are mounted adjustably by means of arrester screws. The roller portions have the width of the strips to be coated. The roller portions on the lower spindle 251 dip into troughs 235 containing a rust-protective agent, while the roller portions on the upper spindle 252 are supplied from troughs 236 having controlled outlets 237, 238. The sheet metal panel 208 covered by layers 208a, b is pushed between the roller portions, whereby the rust protective agent gets into the stripped strips. A bottom plate 211b carries the side portions 211a for the support of the spindles 251, 252 and of the troughs 235, 236.

Instead of using rollers or roller portions, the rust-protective agent may be applied to the work piece by endless belts, which run over rollers. For this purpose endless belts may be used, which run over rollers and are supplied with a rust-protective agent at one point, and are then brought into contact with the work piece for delivering the agent to the same, as shown in FIG. 43.

The transferring belt may be used at the same time also for the coating. Such a belt-operated coating machine is illustrated in FIG. 15. A trolley 280 is guided by pairs of rollers 285 and 286 on a rail of I-profile. Between the walls 280a a two-armed lever 270 is mounted on an axle 281. This lever carries on its outer end a roller 271 with a belt of the same width as the strip to be coated. This belt is guided over a guide roller 276, a support plate 275 and a further guide roller 277 to a presser roller 278 mounted on the other end of the lever 270. Behind this presser roller another presser roller 279 is arranged, which is subjected to spring bias. Above the support plate 275 there is arranged a reservoir 273 for the rust-protective agent. At the bottom of the reservoir a transfer roller 274 is journalled, which protrudes through an opening in the reservoir and coates the belt with the agent to be applied while this belt passes by. The two-armed lever 270 may be lifted off the work piece by a spring 282, and may be pressed against the work piece by a compressed air system comprising a cylinder 283, air supply pipe 283a and piston 284. The work piece, a sheet metal panel 208 coated by layer 208a, b, rests on a support or has a stripped strip. The belt-operated coating machine is guided along this strip by the aid of the rail 287 and of a drive. The belt is firstly coated by the transfer roller with the agent to be applied, e.g. a setting cement, which is then firmly applied by the presser roller 279.

A lasting protection of the edges is attained by covering the edges with a tape. For sheet metal covered with layers of synthetic material this tape may consist of the same foil as that, with which the sheet metal is coated. Preferably the tape is made at one side as a self-adhesive tape, so that it has only to be pressed-on for attachment.

Such a device for the covering of edges with a self-adhesive tape is illustrated in FIGS. 16, 17. It comprises a carriage 323 having a bottom plate 323a, which carries an axle for a reel 315 of adhesive tape. The adhesive tape 315a is supplied over a deflector roller 316 to a pre-folding funnel 317, which folds the adhesive tape about the cut edge 301a of the sheet metal panel 301. The funnel is mounted adjustably between the bottom plate 323a and a top plate 323b. Subsequently, an upper and a lower roller 318 press the adhesive tape against the sheet metal panel, whereby it is attached thereto. At the left hand end of the carriage a cutter 321 for the adhesive tape is mounted. The carriage has both in front and on the rear, pairs of rollers 320, one pair of which runs with their grooves on the edge 301a of the sheet metal panel, and the other on a rail 319. When the device is pushed to the right, the edge 301a of the sheet metal panel is continuously covered by the adhesive tape 315a. Outside the sheet metal panel 301 the device rests on rollers 322. The device is suitable e.g. for edges lying in the direction of transport of the sheet metal panel.

For edges positioned transversely thereof, a device according to FIG. 18 is provided. In a casing 327 a reel 315 of adhesive tape is journalled. The adhesive tape 315a is supplied over a deflector roller 316 to a prefolding funnel 317, and is then pressed on to the sheet metal panel 301 by means of presser rollers 318. On the upper- and under-sides of the casing 327 pairs of rollers 320 are journalled, which run with their grooves on upper and lower rails 324. These rails are arranged above and below a roller track 328 for the sheet metal panel 301. For moving the device, an endless chain 326 is attached to the underside of the device which chain runs over sprocket wheels. One such sprocket wheel is driven from the output pulley 325a of a motor 325 through a pulley 325c and a belt 325b. By pulling the device along the sheet metal panel, the edge of the panel is covered with the adhesive tape, and subsequently the device is returned to its starting position. The covered sheet metal panel may then be carried away in the transport direction.

A further embodiment of a device for covering the edges with an adhesive tape is shown in FIGS. 19, 20. This device 355 comprises a hollow carrier 355a, which carries on both ends bearing plates 355b for journalling an upper presser roller 351a and a lower presser roller 351b. The upper presser roller is journalled in a vertical slot 355c and is pressed by springs 352 against the lower roller. Outside the rollers a reel 350 of adhesive tape is journalled on the carrier. The adhesive tape 350a is stretched out in front of the rollers by a deflector roller. Then the sheet metal panel 301 is pushed against the adhesive tape 350a, and then together with the adhesive tape further into the gap between the presser rollers, and finally through the presser rollers 351a, b, whereby the adhesive tape is firstly folded about the edge 301a of the sheet metal panel, and then pressed-on. Thus, by a short movement of the sheet metal panel forward and back, the edge is covered by the adhesive tape. For this purpose, the sheet metal panel 301 rests on balls 354, which are journalled in a support 353.

The corners can be covered likewise by an adhesive tape. The device according to FIGS. 21 - 23 is an embodiment for the covering of stamped-out recesses in the margin, e.g. of triangular shape, having edges 21b, 21c, which may have been previously covered with lacquer. A base plate 46 carries at one end an axle 47, over which a reel 48 of adhesive tape is pushed. The adhesive tape 49 is passed over a deflector roller 50 and a stretching means 51 for the adhesive tape whose tensioning plate 51a stands on edge perpendicular to the plane of the adhesive tape and protrudes from a pair of clamping jaws 55a, b. The plate 51a is guided between two angle profiles 57a, b, and extends with a disc 51b into a tube 54, which disc is biased outwardly by a compression spring 53. On both sides of the plate 51a there extend clamping jaws 55a, b, which are turned back inwards, and whose shape and length is adapted to the cut-outs punched from the margin. By the side of the tensioning plate 51a, blades 56, FIG. 23, are arranged for making incisions in the adhesive tape at the inner corner 21a. Blades 58a, b are also arranged on the outer ends of the clamping jaws 55a, b, for cutting of the self-adhesive tape at the outer corners 21d, e of the punched cut-outs. The tape 49 is further conducted to a tape attachment 52. Since upon the stretching means 51 for the tape abutting the work piece, the tape becomes slack, the tape attachment is provided with a longitudinal slot 52a, in which a pin 52b fixed to the bottom plate 46 is guided, and is held under spring bias by a compression spring 52c. When pushing the device towards the work piece 21, firstly the tensioning plate 51 with the adhesive tape 49 reaches the inner corner 21a; then the blades 56 make incisions in the adhesive tape; the clamping jaws 55a, b press the adhesive tape against the work piece, beginning at the outer corners 21d, e owing to the angle of the orifice slightly exceeding that of the cut-out; and the blades 58 cut it off. Thus the work piece is protected against rust, in conjunction with the adhesive tape 59 previously applied to the straight edges.

In addition to the outer edges of sheet metal panels the edges of holes within the area of the sheet metal are to be covered. For this purpose, self-adhesive rings 86 (FIG. 28) are used, whose outer diameter 86c exceeds that of the holes 89a, and whose inner diameter 86b is smaller than that of the holes. According to a first embodiment, one ring 86 is pressed from above, and one ring from below against the sheet metal 89, and is cemented-on there; moreover the inwardly protruding portions of the rings are pressed against each other and cemented to one another. Thus the edges of holes or cut-outs are protected from corrosion. A device operating on this principle is illustrated in FIGS. 25 - 27. For the continuous supply of the self-adhesive rings 86 of an external diameter 86a the same are firstly cemented on a tension belt 85 having punched holes 85a (FIG. 24, right hand side), concentrically to the punched holes (FIG. 24, left hand side), and the tension belt with the self-adhesive rings is rolled up in reels 85 (FIG. 25). Below and above the work piece 89 with holes 89a a tension belt 85 is stretched out in such a manner, that the self-adhesive rings 86 are in juxtaposition to the cut-outs 89a. By means of an upper and a lower stamp 87 comprising a punch 87a and die 87b, a self-adhesive ring 86 of the outer diameter 86c (FIG. 28) is produced (FIG. 26) and is presssed by the punch 87a against the work piece 89 and/or the opposite ring 86 and is cemented-on there (FIG. 27). For the purpose of holding the self-adhesive ring 86, each punch 87a has on top in its centre a holder head 87d, which can be depressed against the bias of a spring 87c. Each holder head 87d is surrounded by a rubber ring 87e, which presses the self-adhesive rings 86 within the cut-outs of the work piece against one another (FIG. 27). For the introduction of further self-adhesive rings into the device, the tension belt is wound on reels on the right hand side. A finished covered cut-out is shown in FIG. 28.

According to a second embodiment of single expandable self-adhesive ring is used for the covering. This self-adhesive ring 104 is firstly cemented with its outer periphery to the work piece; the portion protruding into the cut-out is bent through this cut-out in the work piece; and is then pressed against the work piece (FIGS. 30, 31). The device 102 comprises a cylinder 102a fixed to a carrier ledge 101 and having an air supply pipe 106. Into its upper portion a hollow body of rubber 103 is inserted, which has, within the cylinder, a thick-walled portion 103a, and outside a thin-walled cylinder 103b, and on top a solid cone 103c. The outer diameter of the thin-walled cylinder 103b is smaller by twice the layer thickness of the self-adhesive ring than the diameter of the cut-out 89a in the work piece. After pushing a self-adhesive ring 104 over the solid cone 103c the device is raised by means of the carrier ledge 101; the cone penetrates through the cut-out 89a in the work piece; the self-adhesive ring is bent up inside, and pressed on the work piece outside. Then a counterplate 107 bears down from above on the solid cone, while compressed air expands the thin-walled cylinder 103b from inside, whereby the upstanding portion of the self-adhesive ring is pressed on the work piece. A covered cut-out is shown in FIG. 29.

The covering of the edges with a tape may be effected alternatively by welding instead of by cementing. For this purpose the coated edges of the sheet metal and the tape are to be heated to the welding temperature of the latter.

According to a first embodiment, the stretched-out tape and the sheet metal panel lying in front of it, which is covered on both sides with synthetic material, are heated by infra-red radiation to the welding temperature of the synthetic material, and then compressed by being pushed between rollers. A device of this kind is illustrated in FIG. 32. On a base body 480 there are journalled: two hollow rollers 484, 485, which are capable of being cooled by water and pressed against each other by springs; a reel 482 of a weldable tape 481; and a deflector roller 843. In front of the weldable tape and below as well as above the sheet metal panel 444 covered by layers 444a, b infra-red radiators 488, 489 are arranged, screened by baffles and insulating plates. Behind and below the insulation, cooling plates and water-cooled tubes 496 and 497 are arranged, in order to prevent any undesirable heating of the layers 444a, b of the sheet metal adjacent to the edge. A slider 492 mounted horizontally slidably in the base body carries a support 475 with balls 475a for the easy transport of the sheet metal panel, and two electromagnets 494, 495 for arresting the sheet metal panel whike the covering is in progress. After heating the tape and layers to welding temperature, an electromagnet 491 fixed to the base body pulls the slider to the left, whereby the edge 444c of the sheet metal panel folds the weldable tape and pushes the same between the rollers, where it is pressed against the sheet metal. A spring 493 returns the slider 492 after the current has been switched off.

A second embodiment illustrates the heating of the components to be interwelded by means of hot air (FIGS. 33–35). The device comprises a carriage 500, which is guided on rollers 509, on the one hand along a fixed rail 508, and on the other hand along the edge of the sheet metal panel 444. The carriage 500 carries a reel 501 of a weldable tape 502, a deflector roller 503, a pre-folding funnel 504 and two presser rollers 505, 506. A chain 510 pulls the carriage 500 along the edge. In front of the pre-folding funnel 504 a hot air device 507 is arranged. An upper and a lower hot air duct 507a, b, whose supply pipe 507c is provided with a thermometer 507e and a thermostat 507d, issued closely above the edges of the sheet metal and by the side of the adhesive tape 502, and raises the same to its welding temperature during the run of the presser rollers 505, 506. Adjacent the edge to be welded, the layers 444a, b of the sheet metal panel are protected by a cooling device. The latter comprises an upper and a lower cooling tube 496, 497, each with a lateral insulation. Holder magnets 494, 495 retain the sheet metal piece lying on a roller track 475. The weldable tape and the layers of the sheet metal panel are heated to welding temperature of the synthetic material and are then interwelded by the presser rollers 505, 506.

Instead of a weldable tape, a weldable cord 511 may be used in accordance with FIGS. 36, 37. The carriage 500 is provided with the same hot air device 507, has however, in continuation a presser roller 512, and for further deformation a pair of forming rollers 513a, b and a pair of presser rollers 514a, b, so that the weldable cord is placed like a tape about the cut edge. Cooling and holding means are the same as in the preceding Figures.

In addition to the straight and curved edges, also the cut edges in corners and in the angles included e.g. between two turned-up margins of a sheet metal piece are to be protected from corrosion. An embodiment using weldable cords is shown in FIGS. 38, 39. A sheet metal panel 531 covered with layers on both sides, has on the left hand side a downwardly directed angular turn-up 531a, and on the forward side (FIG. 39) a downwardly turned angular turn-up 531b, which turn-ups are in turn provided with turn-ups 531c, d. For the purpose of covering the corner gap of the turn-ups 531a, b serves a device 540. This device comprises a base plate 540a for supporting the sheet metal panel, which plate carries on a downwardly directed arm 540b a hand-operated lever 537 for introducing an inner heating means 545, and a hand-operated lever 543 for pressing-on a presser plate 544 articulated to the base plate. On an upwardly directed extension 540c of the base plate, an external heating means may be attached, which consists in a tube 542 for hot air and is directed on the corner gap as well as on the outer weldable cord 541. The inner heating means 545 comprises a body, which fills the space between the sheet metal panel and the turn-ups and has a groove 545a and is provided with electrical heating. It heats the insides and an internal weldable cord 534. After heating the cord to welding temperature, the levers 537, 543 and accordingly the presser plate 544 and the heater body 545 are pressed against each other, and the weldable cords 534, 541 are interwelded with the coated sheet metal panels 531a, b. For the protection of the outer layers, cooling tubes 533a, b are provided.

For the use of rust-protective devices on sheet metal panels, which are treated on a production line, the treatment devices are to be brought for short periods to the sheet metal panels, and are to be returned after the treatment to a remove position. For this purpose the individual devices are provided with advance devices, and the movements towards and away from the sheet metal panels are automatically controlled. Such an advance device may comprise a casing with an advance means and a slider moved by the latter, which carries a treatment device. By lowering the advance device into abutting an end switch, the advance and the treatment are initiated, and by abutting another end switch the same are switched off, and the device is returned to the remote position.

For use as an advance means, a compressed air jack may be provided, and for the treatment, a device for the application of liquid rust-protective agents may be provided. Such a device for the treatment of sheet metal edges lying in or transversely of the direction of transport of the sheet metal panel, is illustrated in FIG. 40. This device is composed of an applying device 623 and an advance device 629, which brings the applying device into contact with the sheet metal edge. The applying device comprises a storage reservoir 625, which has on top a regulating screw and on the bottom a drip tube, and a sponge chamber 626c arranged underneath, which has resilient slot-ledges 626b covered with felt 631. In the sponge chamber underneath the drip tube, absorbent material 623a is pushed over a plate 624, which is attached to an intermediate wall. The sponge chamber is extended rearwardly; it is constructed as a slider 626 and carries at the end outwardly directed angular turn-ups 626a serving as abutments to return springs 630. In the extension of the sponge chamber a pneumatic advance device 627 is arranged, which comprises a cylinder 627a and a piston rod 627b, and which bears on the sponge chamber. The pneumatic device is attached to the rear wall 629a of a casing 629, whose walls 629b overlap forwardly a return spring 630, and are then constructed as a guide 629c for the slidable sponge chamber 626. When the switch 628 admits compressed air into the advance device 627, the slot ledges 626d are pushed over the sheet metal panel 609, until its edge 609a abuts the sponge 623a, and is coated by the latter. At the same time the switch 632 is actuated, which vents compressed air from the advance device 627. The springs 630 then return the applying device to the rest position.

For speeding up the operation, a drying device 636 for the coated edges is provided. In accordance with FIG. 41, this device comprises an outer tube 636a, an insulation 636b, and an inner tube 636c, which have an orifice 626b pointing towards the edge of the sheet metal. At the end of the inner tube 636c air is blown in through openings 634; this air is heated by heater elements 633, is directed by baffles towards the inserted sheet metal edge 609a, and is vented through discharge holes 635. The drying device is arranged on a slider 626 with angular turn-ups 626a. In the cavity thereof an advance device 627 is accommodated. The latter comprises a cylinder 627a, piston and piston rod 627b, a casing 629 with holder 629b, for the return spring 630 and guide 629c for the return spring 630 and guide 629c for the slider 626. A switch 628 admits compressed air, and another switch 632 lets the same escape, whereby the drying device is firstly advanced, and is subsequently returned by the return springs 630.

A device for covering the edges with an adhesive tape for use on a production line is illustrated in FIG. 42, wherein the advance of the device towards the sheet metal edge as well as the pressing-on of the adhesive tape is effected by compressed air. The device comprises a slider 626 of rectangular cross section extending along the sheet metal panel 609, which slider is subdivided by partition walls into a forward chamber 643 for two clamping jaws 641a, b capable of being pushed apart, and a rear chamber for the accommodation of an advance device, and is provided on its rear face with angular turn-ups 626a. Between each clamping jaw 641 and the forward chamber an inflatable air hose 642 with a compressed air supply pipe is provided. In the rear chamber, a further hose 644 with air supply pipe is arranged in a holder 645 on the rear wall of the casing for the advance means 629. The casing for the advance means 629 embraces with walls 629b embracing the return springs 630, then forms a guide 629c for the slider 626, and is attached on a rail of the structure. In front of the slot between the clamping jaws 641a, b an adhesive tape 640 is stretched out by means of a tension belt 640a. When advancing the covering device, the adhesive tape is torn off the holder belt; it is folded about the edge of the sheet metal 609, and pushed between the clamping jaws, where it is pressed-on by the admission of compressed air into the hoses 641a, b. When switching off the compressed air supply, the springs 630 push the device back, and release the sheet metal panel for continued transport. A switch 649 actuates a belt tensioning device for the next adhesive tape.

A further modification is illustrated in FIG. 43. This applying device comprises a storage reservoir 625 with a dripping pipe, and is fixed to an applying chamber 626, wherein an endless sponge belt 650 circulates over rollers 652 by the aid of an electric motor 651. Behind the belt 650 resilient guide plates 653 are arranged, which effect the pressing of the belt against the edge 609a of the sheet metal panel 609. The applying chamber 626 is constructed as a slider and is provided with angular turn-ups 626a as abutments for return springs 630. The latter are enclosed by walls 629b of an advance device 629, which in its forward portion 629c forms a guide for the applying chamber 626. On the rear of the casing 629a two two-armed levers 655a, are mounted, whose inner arms are each linked to the pull rod 654a of an electromagnet 654, and whose outer arms are each linked to a push rod 656. These push rods are attached to the applying chamber 626. A switch 628 energises the electromagnet 654 when the device is lowered on to it, whereby the pull rod 654a is attracted; the motor 651 is energised; the applying device is pushed towards the edge 609a of the sheet metal panel; and the coating thereof is effected. In the forward position the switch 632 interrupts the current, so that the springs 630 return the device to the rest position.

Apart from simple sheet metal panels, even formed and interwelded sheet metal panels may be protected from rust on their edges. This will be shown with reference to the door of a motor car body composed of interwelded sheet metal panels.

A device 114 for coating the outer edges with lacquer is shown in FIG. 44. This device comprises a reservoir 114a for the rust-protective lacquer, a bottom 115 with holes 115a and a converging extension 114b, which has a slot 114c on the bottom. This extension is filled with absorbent material 116, whose converging lower end 116a can be placed on the edges 117c of an inner wall 117a and of an outer wall 117b of a door 117. For this purpose the device is placed around the door along the cut edges thereof. The device forms a frame, which can be raised and lowered, and which applies lacquer to the cut edges in one stroke. Screws 118 on the top of the reservoir regulate the outflow of lacquer by the aid of bores 118a.

In a modification according to FIG. 45, the lower end of the absorbent material 116 is provided with a slot 116b. Thus, not only the cut edges, but also the adjacent inter-welded margins 117d, e may be protected from corrosion.

Alternatively, the edges may be covered by an adhesive tape. For this purpose an adhesive tape is pressed to the arcuate edges from outside by means of an adhesive tape-covering machine, and the protruding half of the tape is horizontally folded over on to the cut edges. The adhesive tape is stretched out over the straight edges by means of a holder belt capable of being severed. Then, clamping jaws, which are capable of being lowered, bend all the adhesive tapes downwardly about the edges, and press the same on to the work piece, e.g. by the aid of inflatable hoses.

The covering device for the arcuate edges 117f is guided on rails parallel to the edges. This device comprises in accordance with FIGS. 46 – 48 a shallow casing 122; a two-armed lever 125 pivoted on an axle 126 whose one arm 125a carries on an axle 124 a reel 123 of adhesive tape, and whose other arm carries two guide rollers 127a, b, a presser roller 128 for the adhesive tape 123a, and a folding-over roller 129; a cutting-off blade 130, a pneumatic pressing-on device for the presser roller 128, which is composed of a cylinder 134, a piston rod 135, a return spring 136 and a compressed air pipe 137; rollers 131 mounted on the upper surface of the casing and underside thereof, whose grooves are guided on C-shaped rails 120; and a drive consisting in an electric motor 132 fixed to the casing with a friction wheel 132a and an opposite wheel 132b to be pressed on the latter by screws 133 below a runner rail 121. At the beginning of the guide rails there is mounted a switch 140, which closes the circuit for the electric motor 132 and the compressed air supply 137, and at the end of these rails there is a switch 141, which cuts off the supply of compressed air and changes the polarity of the electric motor 132 for the return run. The guide rails with the covering device for the edges are mounted on a frame, which may be lowered for the treatment of the door, and raised for the latter being transported away.

For mechanically stretching out an adhesive tape for the straight edges 117g of the door 117 a belt is used, which is subdivided in the longitudinal direction (FIG. 50), half of which is made an adhesive tape 145 and the other half a tension belt reinforced by threads 145c of synthetic plastics and capable of being torn off the adhesive tape 145 by the aid of short bars 145b. In accordance with FIG. 49 a storage reel 146 of the complete belt is journalled on one side of the door edge to be covered, and another reel 148 for winding the belt 145a upon it is journalled on the other side of it. By turning the reel 148 stepwise by the aid of the motor 147, the adhesive tape is stretched out. In FIG. 49 a second identical stretching-out device 146', 147' is provided for the second door edge, which lies at a right angle to the first one.

The storage- and winding-up reels with their drive are mounted on a frame 154, which can be lowered on the door with the adhesive tapes stretched out. This frame carries inner and outer clamping jaws along the door edges, which jaws bend the adhesive tape 123a about the arcuate edges 117f as well as the adhesive tapes 145 about the edges 117g, and sever the same from the tension belts 145a. Laterally of the inner clamping jaw 150a a block of rubber 151, and laterally of the outer clamping jaw 150b a hose 152 is mounted, which is inflatable by an air supply pipe 153. When inflated, the air hose bears on the clamping jaws, and the latter press the adhesive tapes on the side faces of the edges 117g (FIG. 51). After the pressing-on, the air is vented, the frame with the stretching-out and pressing-on device is raised, and the door is transported further on.

What is claimed is:

1. A method for the protection from corrosion of blank areas of sheet metal otherwise coated with a corrosion-proof layer, comprising the steps of continuously wetting a porous transfer roller with a rust-protective liquid material, rotating said transfer roller in contact with a porous applicator, and rotating said porous applicator in contact with the exposed blank edge portions of said coated sheet metal, thereby applying to said blank areas a permanent layer of said rust-protective material.

2. A method for the protection from corrosion of blank areas of sheet metal otherwise coated with a corrosion-proof layer, comprising the steps of dipping into a container of rust-protective material the lower ends of an applicator and a supply roller, lifting a predetermined quantity of said rust-protective material along the periphery of said supply roller, transferring said quantity of rust-protective agent to said applicator by rotating said applicator in contact with said supply roller, distributing said quantity evenly over the surface of said applicator, moving an exposed blank area of said sheet metal into contact with said applicator, and guidably advancing said applicator relative to said sheet metal, thereby applying to said blank areas a permanent layer of said rust-protective material.

3. A method for the protection from corrosion of blank areas of sheet metal otherwise coated with a corrosion-proof layer, comprising the steps of applying a rust-protective material to a transfer roller, rotating said transfer roller in contact with a continuous transfer belt so as to evenly coat said belt with said rust-protective material, applying the coated surface of said transfer belt to said blank areas, biasing a pressure roller into contact with said transfer belt, and guidably moving said pressure roller or said coated sheet metal relative to the other, thereby pressing against said blank areas a permanent layer of said rust-protective material.

4. A method for the protection from corrosion of blank edges of stamped-out recesses at the margin of sheet metal otherwise coated with a corrosion-proof layer, comprising the steps of stretching a length of self-adhesive, rust-resistant tape over a resiliently biased tensioning plate with the self-adhesive surface of said tape facing one of said stamped-out recesses, moving the blank edges of said stamped-out recesses into pressure contact with said length of tape, making an incision in said length of tape at the inner corner of said stamped-out recess, and folding said tape about the blank edges of said stamped-out recess, thereby covering said blank edges with an adherent layer of said rust-protective tape.

5. A method for the protection from corrosion of blank edges of a hole in sheet metal otherwise coated with a corrosion-proof layer, comprising the steps of applying a disc of self-adhesive, rust-resistant tape having an outer diameter exceeding that of said hole to each surface of the coated sheet metal surrounding said hole, and pressing the inwardly protruding portions of said discs against each other, thereby sealing the edges of said hole from corrosion.

6. A method as in claim 5, further comprising the step of stamping out from the center portion of said discs an opening of diameter smaller than that of said hole in said coated sheet metal.

7. A method as in claim 5, further comprising the steps of carrying self-adhesive, rust-resistant tape on a tension belt, and stamping said discs out of said tape through openings in said tension belt.

8. A method for the protection from corrosion of blank edges of a hole in sheet metal otherwise coated with a corrosion-proof layer, comprising the steps of applying a ring of self-adhesive, rust-resistant tape having an outer diameter exceeding, and an inner diameter smaller than, that of said hole to one surface of the coated sheet metal surrounding said hole, and stretching and bending the inwardly protruding portion of said ring through said hole and around said blank edges, thereby sealing said blank edges of said hole from corrosion.

9. A method as in claim 8, further comprising the steps of carrying self-adhesive, rust-resistant tape on a tension belt and stamping said rings out of said tape through openings in said tension belt.

* * * * *

PO-1050
(5/69)

UNITED STATES PATENT OFFICE
CERTIFICATE OF CORRECTION

Patent No. 3,947,614      Dated March 30, 1976

Inventor(s) OTTO ALFRED BECKER

It is certified that error appears in the above-identified patent and that said Letters Patent are hereby corrected as shown below:

Column 6, line 51:    "oroduction" should read -- production --;

line 68:    "kimits" should read -- limits --.

Column 8, line 65:    "deivce" should read -- device --.

Column 13, line 39:    "843" should read -- 483 --.

line 50:    "whike" should read -- while --.

Signed and Sealed this

Nineteenth Day of October 1976

[SEAL]

*Attest:*

RUTH C. MASON
*Attesting Officer*

C. MARSHALL DANN
*Commissioner of Patents and Trademarks*